US012649325B2

(12) United States Patent
Murata et al.

(10) Patent No.: US 12,649,325 B2
(45) Date of Patent: Jun. 9, 2026

(54) SHEET FEEDING DEVICE AND RECORDING APPARATUS

(71) Applicant: CANON KABUSHIKI KAISHA, Tokyo (JP)

(72) Inventors: Ryosuke Murata, Tokyo (JP); Naoki Wakayama, Kanagawa (JP); Ryosuke Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 152 days.

(21) Appl. No.: 18/532,073

(22) Filed: Dec. 7, 2023

(65) Prior Publication Data

US 2024/0190145 A1 Jun. 13, 2024

(30) Foreign Application Priority Data

Dec. 9, 2022 (JP) ................................ 2022-196825

(51) Int. Cl.

| | |
|---|---|
| ***B65H 16/06*** | (2006.01) |
| ***B41J 11/00*** | (2006.01) |
| ***B41J 15/16*** | (2006.01) |
| ***B65H 23/04*** | (2006.01) |

(52) U.S. Cl.

CPC ........... *B41J 11/0045* (2013.01); *B41J 15/16* (2013.01); *B65H 16/06* (2013.01); *B65H 23/04* (2013.01); *B65H 2701/11312* (2013.01); *B65H 2801/36* (2013.01)

(58) Field of Classification Search

CPC ...... B41J 11/0045; B41J 15/04; B41J 15/046; B41J 15/16; B65H 23/04; B65H 2701/11312; B65H 16/06; B65H 18/02; B65H 18/021; B65H 18/023; B65H 2301/41346; B65H 2301/4134; B65H 2405/422

See application file for complete search history.

(56) References Cited

U.S. PATENT DOCUMENTS

| | | | | |
|---|---|---|---|---|
| 6,983,909 | B2 * | 1/2006 | Bilskie | B65H 19/126 242/559.1 |
| 7,481,390 | B2 * | 1/2009 | Reinhold | B65H 19/2261 242/542.3 |
| 9,002,257 | B2 * | 4/2015 | Saiga | B41J 15/046 399/405 |
| 11,148,893 | B2 * | 10/2021 | Philipse | B41J 15/042 |
| 11,718,113 | B2 | 8/2023 | Murata et al. | |
| 11,851,297 | B2 * | 12/2023 | Harigae | B65H 19/105 |

(Continued)

FOREIGN PATENT DOCUMENTS

| | | | | |
|---|---|---|---|---|
| EP | 3075689 A1 * | 10/2016 | | B65H 19/126 |
| JP | 2022-060733 A | 4/2022 | | |

*Primary Examiner* — Leslie A Nicholson, III

(74) *Attorney, Agent, or Firm* — Venable LLP

(57) ABSTRACT

A sheet feeding device that rotates a roll sheet supported by a holder portion to feed a sheet includes a holder portion that rotatably supports the roll sheet in which the sheet is wound, a first guide portion projecting from the holder portion in a projection direction corresponding to a front direction of the sheet feeding device, and a second guide portion facing the first guide portion and projecting from the holder portion in the projection direction to guide the roll sheet to the holder portion. In a gap between the first guide portion and the second guide portion and below the gap, a space that can be entered by a carrier that carries the roll sheet is formed.

16 Claims, 20 Drawing Sheets

(56) References Cited

U.S. PATENT DOCUMENTS

| | | | | |
|---|---|---|---|---|
| 12,397,568 | B2 * | 8/2025 | Wakayama | B65H 16/06 |
| 2011/0211210 | A1 * | 9/2011 | Niihara | H04N 1/00588<br>358/1.12 |
| 2023/0249481 | A1 | 8/2023 | Wakayama et al. | |

* cited by examiner

SHEET FEEDING DEVICE AND RECORDING APPARATUS

BACKGROUND OF THE INVENTION

Field of the Invention

The present invention relates to a sheet feeding device that pulls, out of a roll sheet in which the sheet is wound, the sheet and feeds the sheet to a recording apparatus including the sheet feeding device.

Description of the Related Art

In a recording apparatus that records an image or the like on a sheet serving as a recording material, a sheet feeding device that rotatably supports a roll sheet and feeds the sheet is provided. Prior to sheet feeding by the sheet feeding device, a worker sets the roll sheet in the sheet feeding device.

Japanese Patent Application Publication No. 2022-60733 discloses a configuration of a sheet feeding device in which, to ensure attachability of a roll sheet to a sheet feeding device, a pivot door portion on which the roll sheet is to be placed is provided in a front surface of the device. The pivot door portion is provided throughout an entire region of the sheet feeding device in a width direction thereof to allow a worker to attach a spool member to the roll sheet placed on the pivot door portion, roll the roll sheet over a guide portion formed in the pivot door portion, and set the roll sheet in a holder portion.

SUMMARY OF THE INVENTION

A roll sheet having a large sheet size or in which the sheet is wound a large number of times is a heavy item and, to carry the roll sheet, a carrier such as a carriage may be used. However, in the configuration described above, when moving the roll sheet from the carrier to the pivot door portion, the worker raises the roll sheet, which may result in heavy labor when the roll sheet is a heavy item.

It is therefore an object of the present invention to provide a sheet feeding device that improves workability in attaching a roll sheet.

To attain the object described above, a sheet feeding device of the present invention includes:

a holder portion that rotatably supports a roll sheet around which a sheet is wound;

a first guide portion projecting from the holder portion in a projection direction corresponding to a front direction of the sheet feeding device to guide the roll sheet to the holder portion; and a second guide portion facing the first guide portion and projecting from the holder portion in the projection direction to guide the roll sheet to the holder portion, wherein the sheet feeding device rotates the roll sheet supported by the holder portion to feed the sheet, and wherein, in a gap between the first guide portion and the second guide portion and below the gap, a space that can be entered by a carrier that carries the roll sheet is formed.

According to the present invention, it is possible to provide a sheet feeding device that improves workability in attaching a roll sheet.

Further features of the present invention will become apparent from the following description of exemplary embodiments with reference to the attached drawings.

DESCRIPTION OF THE EMBODIMENTS

Figure 1:
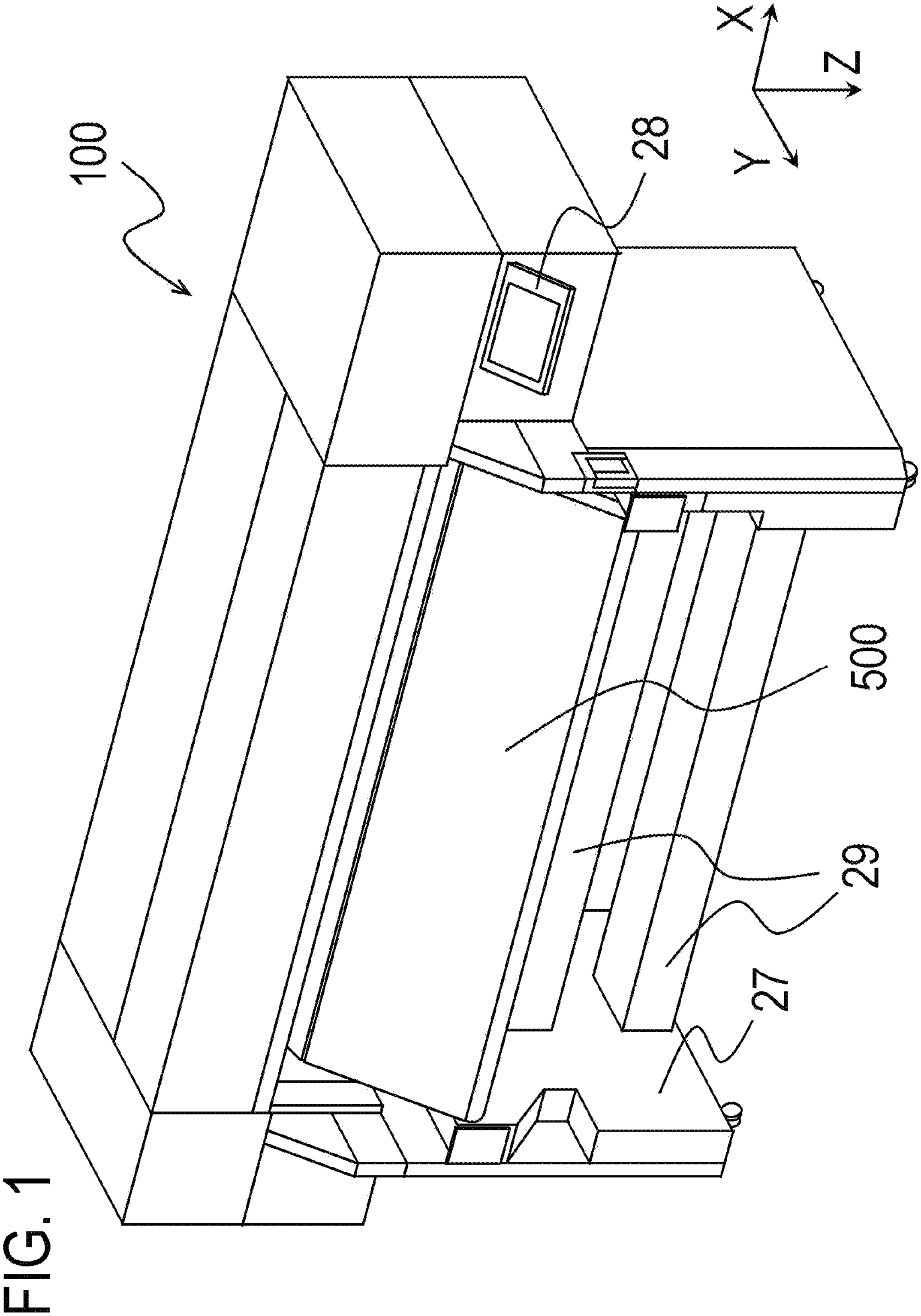
FIG. 1 is a perspective view of a recording apparatus when a sheet discharge guide portion in a first embodiment is in a closed state.

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments are not intended to limit the scope of the invention to the following embodiments. A plurality of features are described in each of the following embodiments, but all of these features are not essential for the invention, and these features may be arbitrarily combined. In the accompanying drawings, an identical or similar composing element is denoted with a same reference numeral, and redundant description may be omitted.

First Embodiment

Recording Apparatus 100

First, a description will be given of a basic configuration of a recording apparatus 100 according to a first embodiment of the present invention. As the recording apparatus, an ink jet recording apparatus including a sheet feeding device for feeding a sheet serving as a print medium and a printing portion that prints an image on the sheet will be described as an application example. In the present specification, "ink" is used as a general term of a liquid such as a recording liquid.

Figure 2:
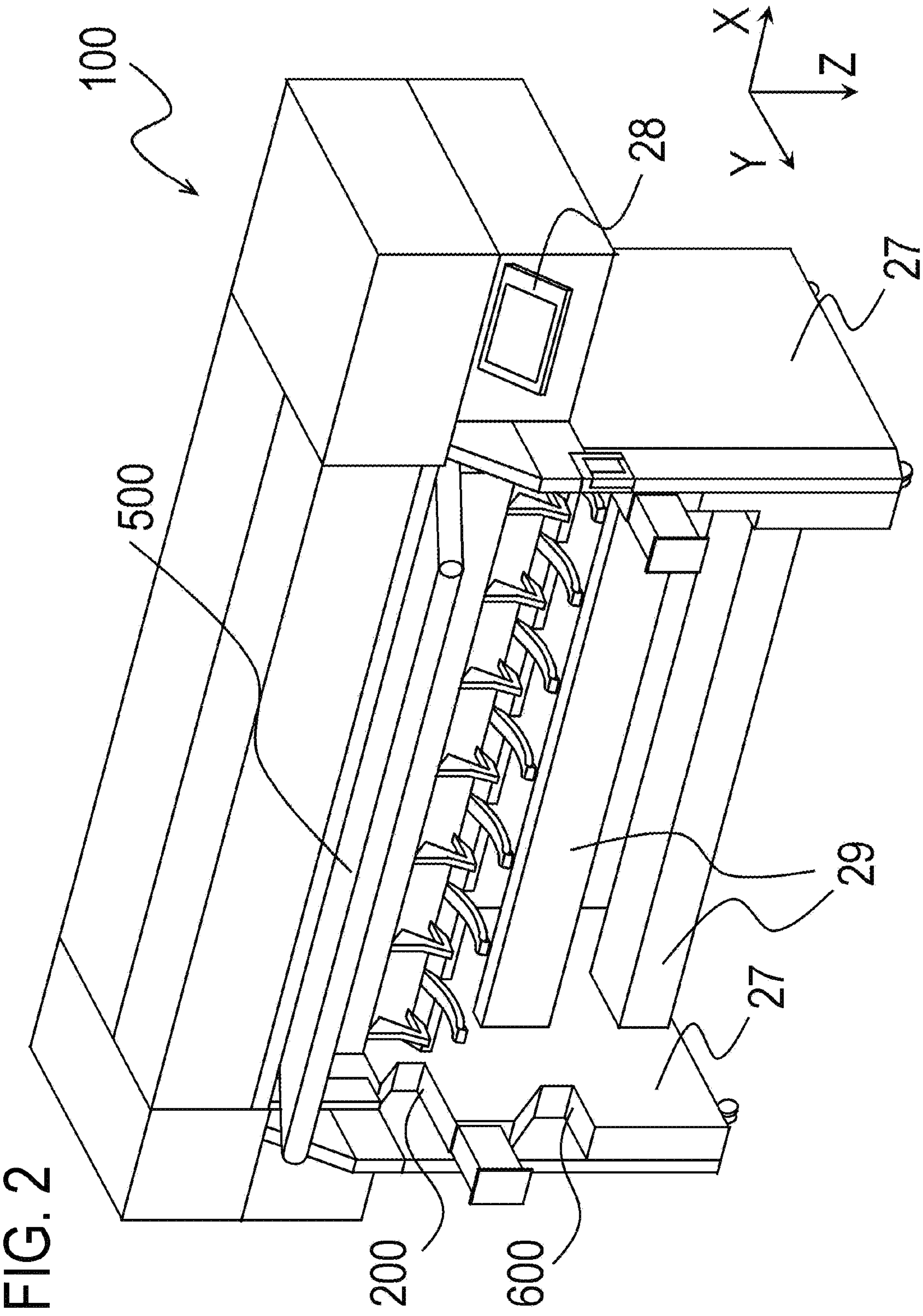
FIG. 2 is a perspective view of the recording apparatus when the sheet discharge guide portion in the first embodiment is in an open state.

The recording apparatus 100 includes a sheet discharge guide portion 500 configured to be openable/closable on a front surface side of the recording apparatus 100. FIG. 1 is a schematic perspective view of the recording apparatus 100 when the sheet discharge guide portion 500 is in a closed state. FIG. 2 is a schematic perspective view of the recording apparatus 100 when the sheet discharge guide portion 500 is an open state. Note that, in each of the drawings, a left-right direction of the recording apparatus 100, a front-rear direction of the recording apparatus 100, and a gravity direction are respectively indicated appropriately as an X-direction, a Y-direction, and a Z-direction. In the present embodiment, the X-axis direction, the Y-axis direction, and the Z-direction are perpendicular to each other. Meanwhile, a roll sheet is supported by the recording apparatus 100 such that an axial direction of the roll sheet is parallel to the Y-axis direction.

The recording apparatus 100 is configured to include a feeding portion that supports the roll sheet in which the sheet is wound and feeds the sheet, a printing portion (recording portion) that performs a printing operation (recording operation) on the fed sheet, and a winding portion that winds up the sheet on which the recording operation has been performed. As illustrated in FIG. 2, each of a feeding side roll set portion 200 that supports the roll sheet and a winding side roll set portion 600 is provided on a front side of the recording apparatus 100. The feeding side roll set portion 200 is located above the winding side roll set portion 600. In the recording apparatus 100, the sheet pulled out of the roll sheet supported by the roll set portion 200 on the front side of the apparatus is fed rearwardly toward the printing portion. Then, the sheet having an image printed thereon by the printing portion passes through the sheet discharge guide portion 500 to be wound up by the roll set portion 600 provided on the front side of the recording apparatus 100.

When the roll sheet is to be set in the roll set portion 200, as illustrated in FIG. 2, the sheet discharge guide portion 500 is brought into the open state. Meanwhile, during a printing operation of printing the image on the sheet, as illustrated in FIG. 1, the sheet discharge guide portion 500 is brought into the closed state. When the sheet discharge guide portion 500 is in the closed state, the sheet fed from the roll set portion 200 passes through a sheet conveying portion to reach the printing portion and have the image printed thereon by the printing portion, and is then discharged to the sheet discharge guide portion 500.

The recording apparatus 100 includes two main-body leg portions 27 that support, from both sides of the recording apparatus 100 in the left-right direction, the sheet conveying portion and the printing portion each described above and a connecting portion 29 provided between the two main-body leg portions 27 to connect the two main-body leg portions 27. The main-body leg portions 27 support the sheet conveying portion, the printing portion, and the like and support the roll sheet via the roll set portion 200 to receive a load resulting from weights thereof. The main-body leg portions 27 are in contact with a floor surface via casters to relieve the weight of the recording apparatus 100 to the floor surface. The connecting portion 29 connects the two main-body leg portions 27 to prevent the main-body leg portions 27 from collapsing due to the weight.

The recording apparatus 100 also includes an operation panel 28 provided on a front side of the recording apparatus 100. Using various switches included in the operation panel 28 and the like, a user can input various commands to the recording apparatus 100, such as a roll sheet size specification and setting of a roll type.

Figure 3:
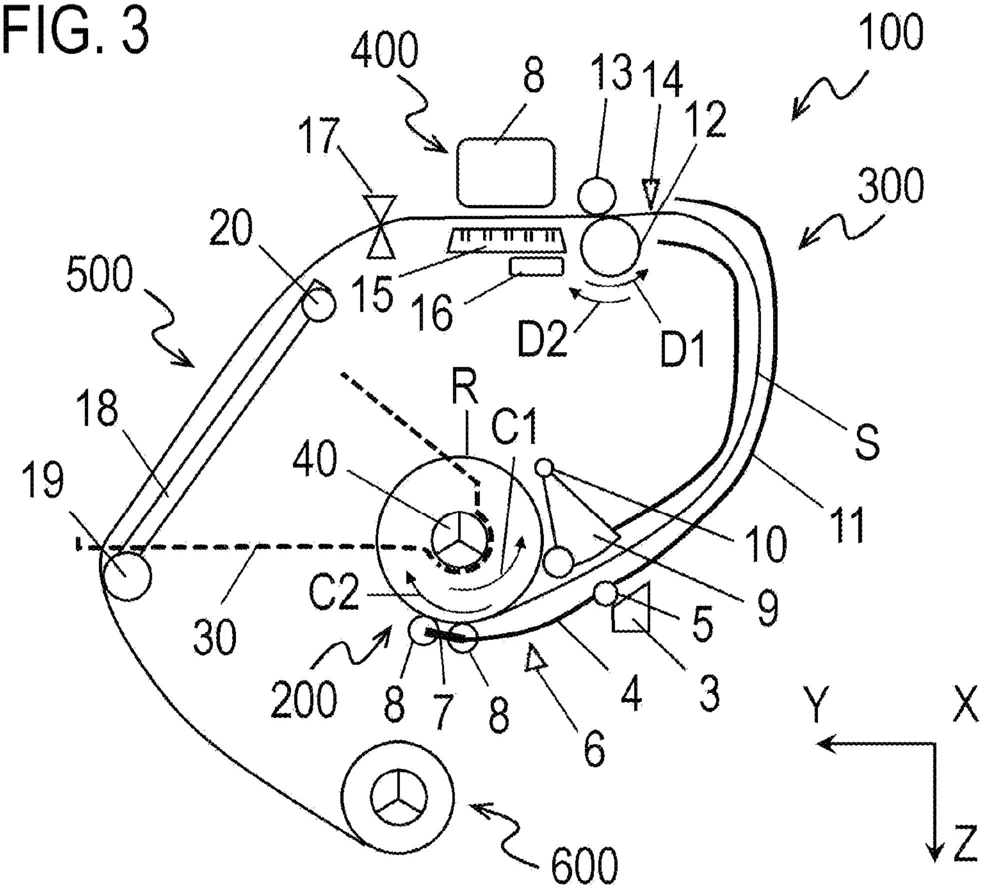
FIG. 3 is a schematic cross-sectional view of the recording apparatus in the first embodiment.

FIG. 3 is a schematic cross-sectional view of a main portion of the recording apparatus 100. A sheet S pulled out of a roll sheet R set in the feeding side roll set portion 200 is connected to a sheet tube (roll) set in the winding side roll set portion 600 to be wound up. The recording apparatus 100 includes, in order from an upstream side in a direction in which the sheet S is conveyed, the feeding side roll set portion 200, a sheet conveying portion 300, a printing portion 400, the sheet discharge guide portion 500, and the winding side roll set portion 600. The sheet S pulled out of the roll sheet R set in the roll set portion 200 passes through the sheet conveying portion 300 to be conveyed to the printing portion 400 capable of printing an image. The printing portion 400 ejects the ink from an ink-jet-type print head 23 to print an image on the sheet S. Then, the sheet S having the image printed thereon is wound up around the sheet tube in the roll set portion 600, while being guided by the sheet discharge guide portion 500.

The print head 23 uses an ejection energy generating element such as an electrothermal conversion element (heater) or a piezoelectric element to eject the ink from an ejection port. The print head 23 in the present embodiment can foam the ink with heat generated from the electrothermal conversion element to allow the ink to be ejected from the ejection port by using foaming energy thereof. Note that, in applying the present invention, an ink ejection method for the print head 23 is not limited to the ink-jet method. In addition, the printing method for the printing portion 400 is not limited to that in the configuration described above, either. For example, the printing method may be a serial scanning method, a full-line method, or the like. In the case of the serial scanning method, an image is printed on the sheet S as a result of each of an operation of conveying the sheet S and scanning with the print head 23 in a direction crossing the direction in which the sheet S is conveyed. In the case of the full-line method, the elongated print head 23 extending in the direction crossing the direction in which the sheet S is conveyed is used, and the image is printed on the sheet S, while the sheet S is continuously conveyed.

Into a hollow hole portion of the roll sheet R, an attachment member 40 having an axial shape is inserted to be attached, and the roll sheet R is supported by the roll set portion 200 via the attachment member 40. The attachment member 40 is attached to the roll sheet R so as to project from both end portions of the roll sheet R in the axial direction thereof. When set in the roll set portion 200, the attachment member 40 is drive-connected to a drive source such as a roll drive motor to be driven to normally and reversely rotate. Then, the attachment member 40 holding a center portion of the roll sheet R is supported integrally with the roll sheet R by the roll set portion 200 to be normally and reversely rotatable in directions C1 and C2 (see FIG. 3).

The roll set portion 200 includes a drive portion 3, an arm member (moving body) 4, an arm rotation shaft 5, a first sheet sensor 6, a swinging member 7, pressure contact members 8, a separating flapper (upper guide body) 9, and a flapper rotation shaft 10. The roll set portion 200 can also be regarded as the sheet feeding device included in the recording apparatus 100, which pulls the sheet S out of the supported roll sheet R and feeds the sheet S. During the feeding of the sheet S, the roll sheet R rotates in the direction C1, and the sheet S is conveyed to the sheet conveying portion 300, while being guided by the separating flapper 9 and the like.

The pressure contact members 8 are upwardly biased in the gravity direction to move according to an outer diameter of the roll sheet R set in the roll set portion 200 and come into pressure contact, from below in the gravity direction, with an outer peripheral surface of the roll sheet R. Each of the pressure contact members 8 is a driven rotating member configured to be rotatable with rotation of the roll sheet R. An arm member 4 is a sheet guide member that moves in conjunction with the pressure contact members 8 to guide a lower surface of the sheet S pulled out of the roll sheet R.

The sheet conveying portion 300 includes a feeding side conveyance guide 11, a conveying roller 12, a nip roller 13, and a second sheet sensor 14. The feeding side conveyance guide 11 leads the sheet S to the printing portion 400, while guiding top/back surfaces of the sheet S pulled out of the roll sheet R supported by the roll set portion 200. The conveying roller 12 is normally and reversely rotated by a conveying roller drive motor in directions D1 and D2 (see FIG. 3). The nip roller 13 can be driven to rotate in response to the rotation of the conveying roller 12, can be brought into contact with/separated from the conveying roller 12 by a nip roller separation motor (not shown), and has an adjustable nip force. The conveying roller 12 is rotated when the second sheet sensor 14 senses a leading end of the sheet S. A speed at which the sheet S is conveyed by the conveying roller 12 is set higher than a speed at which the sheet S is pulled out by the rotation of the roll sheet R. In other words, the sheet S is conveyed, while being stretched in the conveyance direction under a back tension given thereto. As a result, it is possible to prevent the sheet S from loosening and suppress formation of a folded line in the sheet S and occurrence of a conveyance error.

The printing portion 400 includes the print head 23, a platen 15, a suction fan 16, and a cutter 17. The platen 15 sucks the back surface of the sheet S through a suction hole provided in the platen 15 under a negative pressure generated by the suction fan 16. Consequently, a position of the sheet S is regulated along an upper surface of the platen 15, and an image is accurately printed on the sheet S by the print head 23. The cutter 17 is located on a downstream side of the print head 23 in the direction in which the sheet S is conveyed, and is configured to be able to cut the sheet S having the image printed thereon.

The sheet discharge guide portion 500 includes a sheet discharge conveyance guide 18, a driven roller 19, and a pivot shaft 20. The sheet discharge conveyance guide 18 is a sheet guide member that leads the sheet S to the winding side roll set portion 600, while guiding the back surface (surface opposite to the surface on which the image is to be printed) of the sheet S pulled out from the printing portion 400. In a state where the leading end of the sheet S is fixed to the sheet tube set in the roll set portion 600, the set sheet tube rotates according to a conveyance speed of the conveying roller 12 to allow the sheet S having the image printed thereon by the printing portion 400 to be continuously wound up.

The driven roller 19 is provided at a winding side end portion (downstream-side end portion in the direction in which the sheet S is conveyed) of the sheet discharge conveyance guide 18. The sheet S is gently curved along the driven roller 19 to reduce damage received by the sheet S, reduce conveyance resistance in a curved portion, and prevent large deflection from occurring between the conveying roller 12 and the driven roller 19. In addition, by providing a configuration which extends the sheet S along the sheet discharge conveyance guide 18 and the driven roller 19, it is possible to heat the sheet discharge conveyance guide 18 with a heating portion (not shown) as necessary and assist heat fixation of the ink ejected in the printing portion 400 to the sheet S.

The pivot shaft 20 is provided at a feeding side end portion (upstream-side end portion in the direction in which the sheet S is conveyed) of the sheet discharge conveyance guide 18. The sheet discharge conveyance guide 18 and the driven roller 19 are pivotable around the pivot shaft 20. When the roll sheet R is attached/detached to/from the roll set portion 200, by pivoting the sheet discharge guide portion 500 to bring the sheet discharge guide portion 500 into an open state and upwardly retracting the sheet discharge conveyance guide 18 and the driven roller 19, it is possible to set the roll sheet R without causing interference with the sheet discharge guide portion 500.

Attachment Member 40

Figure 4A:
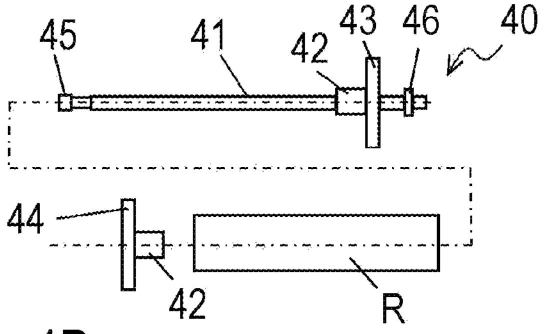
FIGS. 4A to 4C are diagrams illustrating a method of attaching an attachment member in the first embodiment.
Figure 4B:
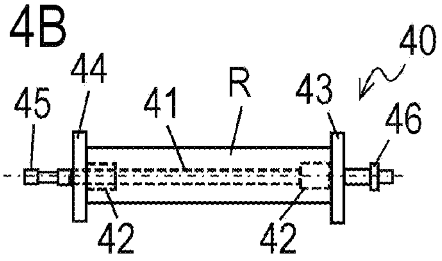
Figure 4C:
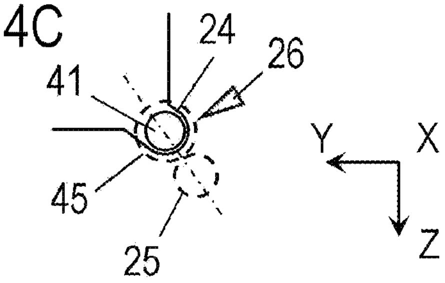

Next, a description will be given of the attachment member 40 to be attached to the roll sheet R when the roll sheet R is set in the roll set portion 200. The attachment member 40 is attached to the roll sheet R so as to project from both end portions of the roll sheet R in the axial direction thereof, and the roll set portion 200 supports the roll sheet R via the attachment member 40. FIGS. 4A, 4B, and 4C are diagrams illustrating a procedure of setting the roll sheet R in the roll set portion 200 by using the attachment member 40. FIG. 4A is an exploded view of the roll sheet R and the attachment member 40. FIG. 4B is the diagram illustrating the attachment member 40 being fixed to the roll sheet R. FIG. 4C is the diagram illustrating the attachment member 40 being supported by the roll set portion 200.

The attachment member 40 includes a spindle 41, friction members 42, a reference flange 43, a non-reference flange 44, a spindle gear 45, and a guide shaft 46. The spindle 41 is an axial member having one end provided with each of the reference flange 43 and the guide shaft 46 and another end to which the spindle gear 45 for rotating the spindle 41 has been attached. The non-reference flange 44 is configured to be detachable from the spindle 41. The reference flange 43 and the non-reference flange 44 are provided with the respective friction members 42 that come into contact with an inner peripheral surface of the roll sheet R.

The reference flange 43 and the non-reference flange 44 are formed to have respective outer diameters larger than an outer diameter of the roll sheet R. In a state where one end of the roll sheet R is in contact with the reference flange 43 and another end of the roll sheet R is in contact with the non-reference flange 44, the attachment member 40 is attached to the roll sheet R. The spindle gear 45 has a gear portion formed with a gear and a non-gear portion having a diameter larger than an outer diameter of the spindle 41. The guide shaft 46 is provided on a reference side of the spindle 41 with respect to the reference flange 43 and formed to have an outer diameter equal to that of the non-gear portion of the spindle gear 45. Accordingly, by supporting the spindle gear 45 and the guide shaft 46 with the same plane, the roll sheet R is supported by the attachment member 40 in a state where the axial direction of the roll sheet R is horizontal.

In the attachment of the attachment member 40 to the roll sheet R, in a state where the non-reference flange 44 in which the spindle 41 is fitted has been detached, the spindle 41 is inserted into the hollow hole portion of the roll sheet R. The outer diameter of the spindle 41 is smaller than an inner diameter of the hollow hole portion of the roll sheet R, and accordingly the worker can insert the spindle 41 into the roll sheet R with a minor force.

The spindle 41 is configured such that, when the spindle 41 is inserted in the roll sheet R, a gap is formed between the spindle 41 and the roll sheet R. In a state where one end of the roll sheet R in the axial direction is in contact with the reference flange 43, the friction member 42 provided on the reference flange 43 is inserted into the hollow hole portion of the roll sheet R. Then, the friction member 42 comes into contact with the inner peripheral surface of the roll sheet R to fix the reference flange 43 to the roll sheet R. Then, the spindle 41 is fitted into the non-reference flange 44 and, in a state where the other end of the roll sheet R is in contact with the non-reference flange 44, the friction member 42 provided on the non-reference flange 44 is fitted into the hollow hole portion of the roll sheet R. Then, the friction member 42 comes into contact with the inner peripheral surface of the roll sheet R to fix the non-reference flange 44 to the roll sheet R.

As illustrated in FIG. 4B, in a state where the spindle 41 is inserted through the inside of the roll sheet R and the roll sheet R is interposed between the reference flange 43 and the non-reference flange 44 in the axial direction of the roll sheet R, the attachment member 40 is attached to the roll sheet R. In other words, in a state where the attachment member 40 is attached to the roll sheet R, the reference flange 43 and the guide shaft 46 are located on one end side of the roll sheet R in the axial direction, while the non-reference flange 44 and the spindle gear 45 are located on another end side of the roll sheet R in the axial direction. As illustrated in FIG. 4C, both end portions of the attachment member 40 in a longitudinal direction are fitted into spindle holders 24 of the roll set portion 200 to set the roll sheet R in the roll set portion 200 via the attachment member 40.

In the first embodiment, the outer diameters of the reference flange 43 and the non-reference flange 44 each serving as a spindle flange are about 170 mm. Meanwhile, a maximum outer diameter of the roll sheet R used in the recording apparatus 100 is about 180 mm, while an inner diameter of the hollow hole portion of the roll sheet R is 2 inches (50.8 mm) or 3 inches (76.2 mm). However, in applying the present invention, the outer diameter of the spindle flange, the maxim outer diameter of the roll sheet R, and the inner diameter of the hollow hole portion are not limited to these numerical values.

The roll set portion 200 includes the spindle holders 24, a drive gear 25, and a roll sensor 26. The spindle holders 24 are provided at respective positions corresponding to both end portions of the spindle 41 in the longitudinal direction. The spindle holders 24 have respective inner surfaces each formed in a U-shaped shape to allow the end portions of the spindle 41 to be fitted from opening sides thereof. In a state where the attachment member 40 is fitted in the spindle holders 24, the spindle gear 45 is connected to the roll drive motor serving as the drive source via the drive gear 25 provided in the roll set portion 200. By the roll drive motor, the roll sheet R is driven together with the attachment member 40 to normally and reversely rotate and thereby allow an operation of conveying the sheet S to be performed. Thus, the spindle holders 24 function as a roll support portion that supports the roll sheet R via the attachment member 40 so as to allow the sheet S to be fed out from the roll sheet R. Meanwhile, the roll sensor 26 senses the presence or absence of the roll sheet R in the roll set portion 200.

By thus using the attachment member 40 to hold the roll sheet R, it is possible to set the roll sheets R having different widths in the roll set portion 200 by using the attachment member 40 and the spindle holders 24. Accordingly, the recording apparatus 100 is configured to allow the roll sheets R of various sizes ranging from larger sizes such as, e.g., A0 and A1 to smaller sizes to be set in the roll set portion 200, as long as the widths are not more than the length of the spindle 41. In addition, since the end portion of the roll sheet R is fitted in the reference flange 43 fixed to the spindle 41, the position of the reference-side end portion of the roll sheet R is fixed with respect to the roll set portion 200.

In the first embodiment, as an auxiliary member that supports the roll sheet R and sets the roll sheet R in the roll set portion 200, the attachment member 40 having the spindle 41, the reference flange 43, and the non-reference flange 44 is used. However, in applying the present invention, the attachment member is not limited to a configuration as described above as long as the attachment member is configured to be able to rotatably hold the roll sheet R with respect to the roll set portion 200. For example, the attachment member may also have, as a simpler configuration, a configuration which has no spindle, includes only flange portions provided with friction members to be fitted into both ends of the roll sheet, and rotates and supports the roll sheet R. Alternatively, the attachment member may also have a configuration which has no flange and in which the roll sheet is fixed by a fixing mechanism provided in the spindle. However, in applying the present invention, the attachment member 40 is preferably configured to be able to be simply moved over a guide portion (described later).

Roll Set Portion 200

Next, a description will be given of a detailed configuration of the roll set portion 200. The roll set portion 200 includes a holder portion that rotatably supports the roll sheet R via the attachment member 40 and a guide portion connected to the holder portion to guide the roll sheet R to the holder portion, while supporting the roll sheet R. In the first embodiment, the holder portion is configured to include the spindle holders 24. The guide portion is configured to include a first guide portion 210 and a second guide portion 220.

Figure 5:
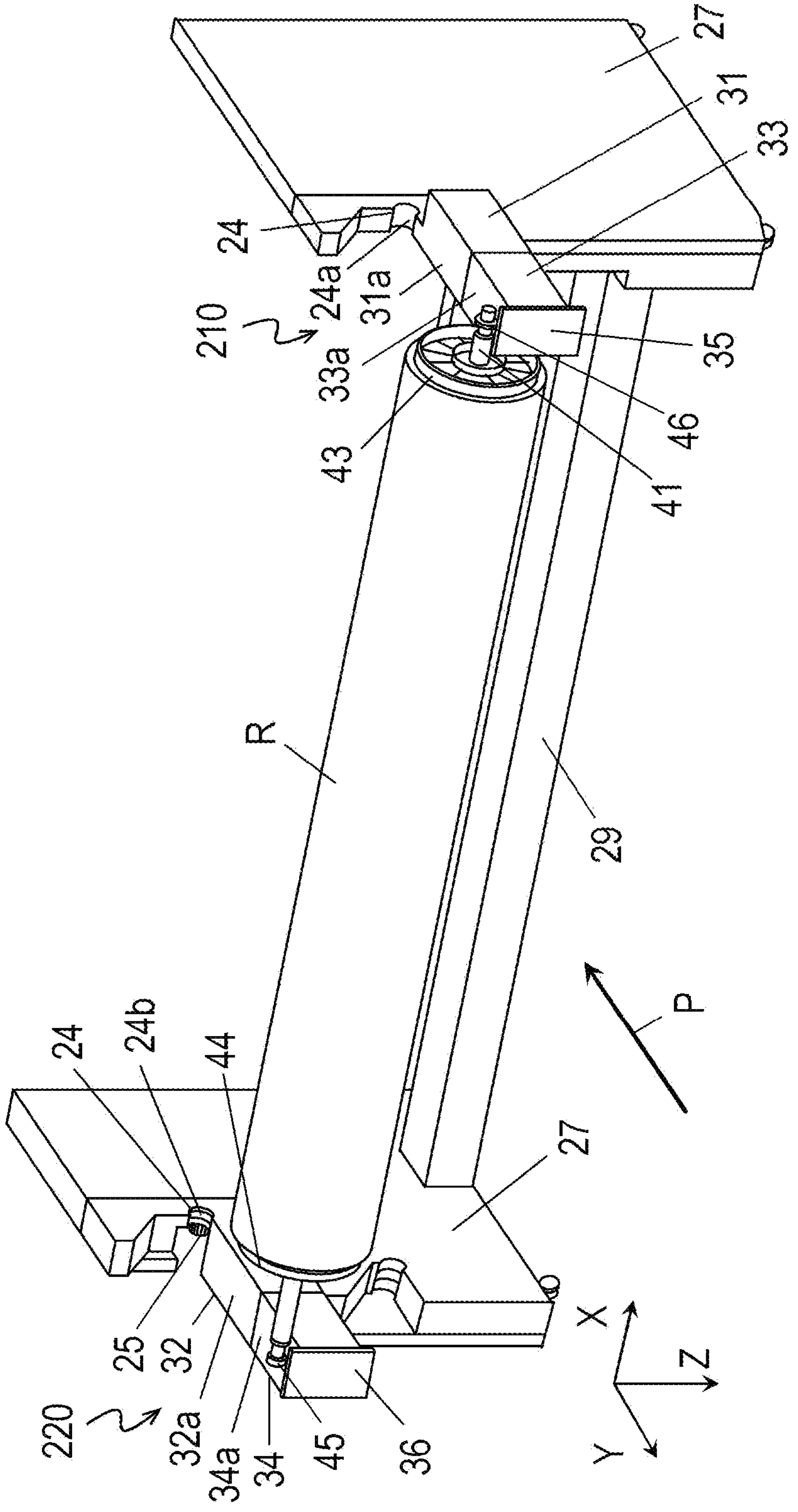
FIG. 5 is a perspective view of a roll set portion in the first embodiment.

FIG. 5 is a perspective view of periphery of the roll set portion 200, which illustrates a condition in which the attachment member 40 attached to the roll sheet R is placed over the first guide portion 210 and the second guide portion 220. The first guide portion 210 projects forwardly of the recording apparatus 100 from the spindle holders 24 to support a reference-side end portion of the attachment member 40. The second guide portion 220 projects forwardly of the recording apparatus 100 from the spindle holders 24 to face the first guide portion 210 and support a non-reference-side end portion of the attachment member 40. The first guide portion 210 and the second guide portion 220 face each other in the left-right direction (X-direction) of the recording apparatus 100. In the first embodiment, the guide shaft 46 of the attachment member 40 comes into contact with the first guide portion 210, the spindle gear 45 comes into contact with the second guide portion 220, and the attachment member 40 is supported by the guide portion in a state where the axial direction of the roll sheet R is horizontal.

In the recording apparatus 100, the connecting portion 29 connecting the spindle holders 24 and the two main-body leg portions 27 is provided on a rear side of the guide portion. When viewed in the gravity direction, the first guide portion 210 and the second guide portion 220 project from the spindle holders 24 in the projection direction opposite to the direction in which the sheet S is fed. In other words, no structure is provided in a gap between the first guide portion 210 and the second guide portion 220, a space below the gap, and a space forward of the space.

Each of the first guide portion 210 and the second guide portion 220 is fixed to the main-body leg portions 27. A distance between the first guide portion 210 and the second guide portion 220 is shorter than a length of the spindle 41. In other words, in a state where one end portion of the attachment member 40 is placed on the first guide portion 210, another end portion of the attachment member 40 can be placed on the second guide portion 220.

The attachment member 40 attached to the roll sheet R is rolled or slid over the guide portion along a rearwardly extending direction P to be guided by the guide portion to the spindle holders 24. The spindle holder 24 has a first bearing surface 24*a* supporting the reference-side end portion of the attachment member 40 and a second bearing surface 24*b* supporting the non-reference-side end portion of the attachment member 40. When the attachment member 40 moves from the guide portion to be set in the spindle holders 24, the spindle gear 45 is connected to the drive gear 25 to provide a state where the attachment member 40 receives a drive force to be integrally rotatable with the roll sheet R.

The first guide portion 210 includes a first rear member 31 forwardly projecting from the spindle holder 24 and a first front member 33 forwardly projecting from the first rear member 31. Likewise, the second guide portion 220 includes a second rear member 32 forwardly projecting from the spindle holder 24 and a second front member 34 forwardly projecting from the second rear member 32.

The first front member 33 may be configured to be containable inside the first rear member 31 such that the first guide portion 210 is extendable/retractable in the front-rear direction of the recording apparatus 100, or may also be configured to be detachable from the first rear member 31. Likewise, the second front member 34 may be configured to be containable inside the second rear member 32 such that the second guide portion 220 is extendable/retractable in the front-rear direction of the recording apparatus 100, or may also be configured to be detachable from the second rear member 32.

When the guide portion is configured to be extendable/retractable, during replacement of the roll sheet R, by extending the first guide portion 210 and the second guide portion 220, a space D in which a carrier for carrying the roll sheet R is movable is formed large, and the roll sheet R can be placed over the guide portion with excellent workability. In addition, since the space D is formed large, it is possible to allow the carrier holding the larger-diameter roll sheet R to enter the space D and place the roll sheet R over the guide portion. Meanwhile, during the printing operation, the first guide portion 210 and the second guide portion 220 is retracted to prevent, when the worker operates the recording apparatus 100, the guide portion from interrupting the operation. In addition, it is possible to reduce an area occupied by the main body of the installed recording apparatus 100, which contributes to space saving. In other words, the first guide portion 210 and the second guide portion 220 each configured to be extendable/retractable in the front-rear direction can improve workability in replacing the roll sheet R without interrupting the operability of the recording apparatus 100. A specific example of a configuration in which the guide portion is extendable/retractable will be described later using a second embodiment.

The guide portion of the roll set portion 200 supports the attachment member 40 with a first guide surface of the first guide portion 210, while supporting the attachment member 40 with a second guide surface of the second guide portion 220. The first guide surface includes a first rear guide surface 31*a* of the first rear member 31 and a first front guide surface 33*a* of the first front member 33. The second guide surface includes a second rear guide surface 32*a* of the second rear member 32 and a second front guide surface 34*a* of the second front member 34.

In the first embodiment, each of the first rear guide surface 31*a*, the first front guide surface 33*a*, the second rear guide surface 32*a*, and the second front guide surface 34*a* is formed in the same plane. Since the guide surfaces that support and guide the attachment member 40 are formed in the same plane, no step is formed along a boundary between the first rear guide surface 31*a* and the first front guide surface 33*a* or along a boundary between the second rear guide surface 32*a* and the second front guide surface 34*a*. As a result, the worker can smoothly move the attachment member 40 from the guide portion to the spindle holders 24. The guide portion thus configured allows the attachment member 40 to smoothly move over the guide portion and improve workability in attaching the roll sheet R in the roll set portion 200.

At a tip end of the first front member 33 of the first guide portion 210, a step portion 35 is provided to upwardly project from the first front guide surface 33*a* while, at a tip end of the second front member 34 of the second guide portion 220, a step portion 36 is provided to upwardly project from the second front guide surface 34*a*. Since the step portion 36 is provided at the tip end of the guide portion, it is possible to prevent the attachment member 40 placed over the guide portion from falling on a front side.

Figure 6:
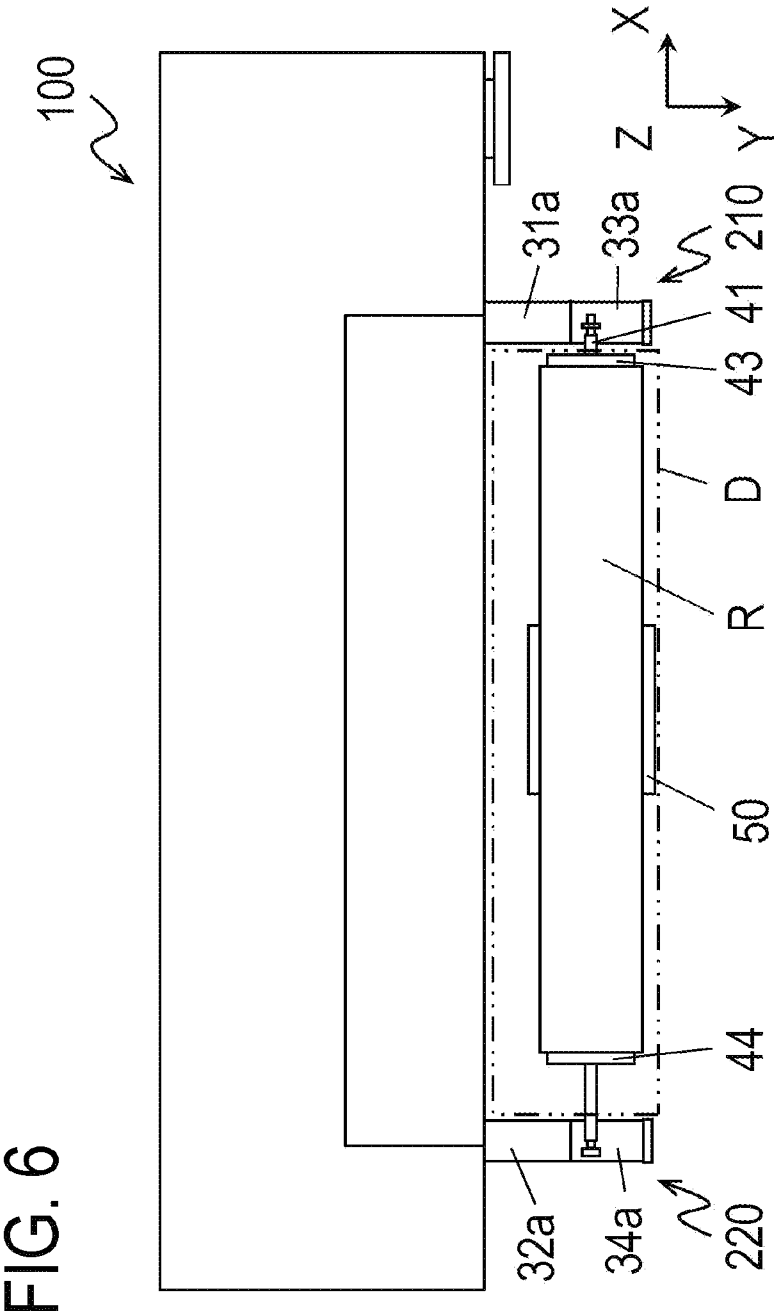
FIG. 6 is a top view of the recording apparatus, a roll sheet, and a carriage in the first embodiment.
Figure 7:
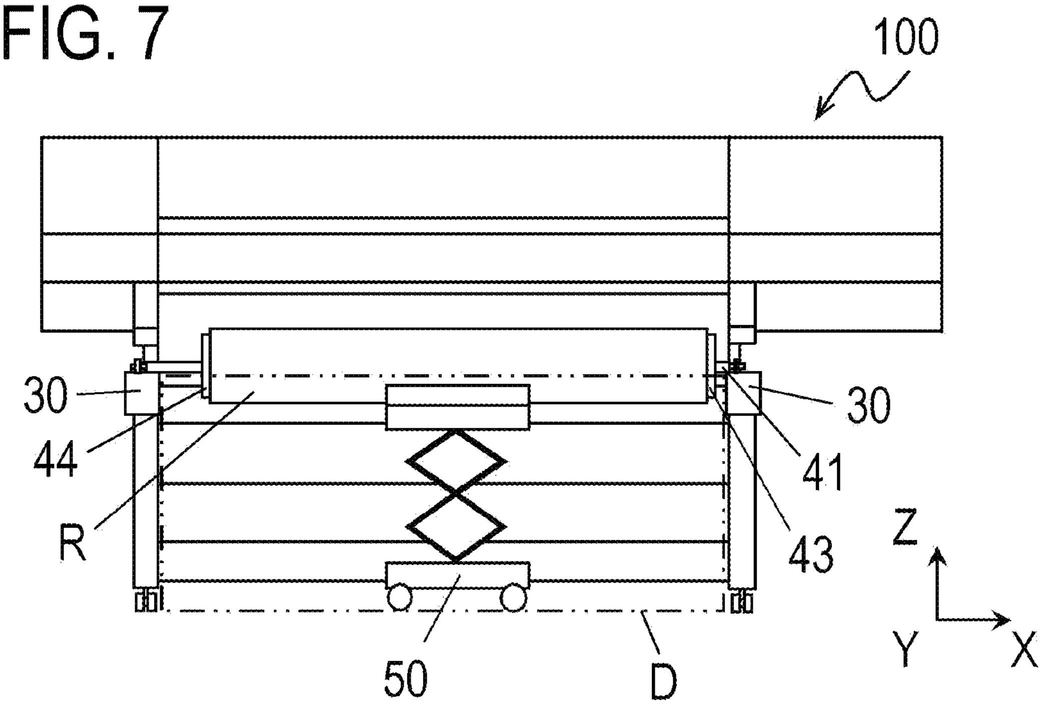
FIG. 7 is a front view of the recording apparatus, the roll sheet, and the carriage in the first embodiment.

FIG. 6 is a top view of the recording apparatus 100, which illustrates placement of the attachment member 40 attached to the roll sheet R over the guide portion using a carriage 50 serving as the carrier. FIG. 7 is a front view of FIG. 6. Note that, in FIGS. 6 and 7, illustration of a structure portion such as the sheet discharge guide portion 500 upwardly retracted from the roll set portion 200 is omitted.

As described above, a structure including the connecting portion 29 is not placed in the gap between the first guide portion 210 and the second guide portion 220 and in the space D formed below the gap. In FIG. 6 and the like, the space D is indicated by a two-dot-dash line. Such a configuration allows the carriage 50 to enter the space D, while supporting the roll sheet R. In addition, the carriage 50 can move in the space D in the front-rear direction and the left-right direction of the recording apparatus 100. Therefore, with the configuration in the first embodiment, even before and after the carriage 50 is caused to enter the space D, it is possible to move the carriage 50 and easily adjust relative positions of the roll sheet R and the attachment member 40 with respect to the guide portion, which improves the workability in attaching the roll sheet R.

Figure 8:
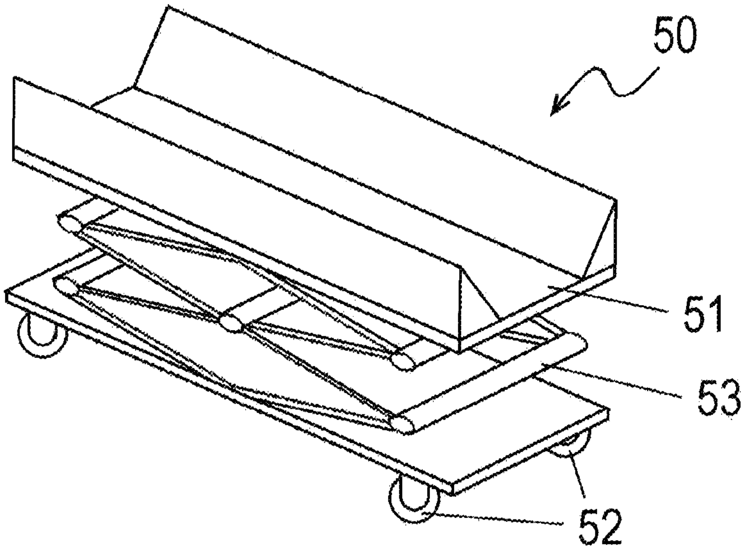
FIG. 8 is a perspective view of the carriage in the first embodiment.

FIG. 8 is a perspective view of the carriage 50 that carries the roll sheet R. The carriage 50 is a carrier that can be used appropriately for the recording apparatus and the sheet feeding device to which the present invention is applied. The carriage 50 has a receiving portion 51 that supports the roll sheet R, wheel portions 52, and a height adjusting portion 53 that adjusts a height of the receiving portion 51. The receiving portion 51 is formed to have a width that does not interfere with the guide portion when entering the space D.

The carriage 50 is freely movable over a floor with the wheel portions 52 provided in a lower portion thereof. The height adjusting portion 53 provided under the receiving portion 51 is configured to be extendable/retractable in a vertical direction to raise/lower the receiving portion 51.

The receiving portion 51 can support the roll sheet R from below in the state where the axial direction of the roll sheet R is horizontal, i.e., at the same attitude as that when the roll sheet R is supported in the roll set portion 200. The receiving portion 51 has two receiving portion slopes formed to come into contact with the roll sheet R from below. When the receiving portion 51 supporting the roll sheet R is viewed in the axial direction of the roll sheet R, the two receiving portion slopes form a V-shaped shape. In a state where the roll sheet R is placed on the receiving portion 51, the roll sheet R is in contact with both of the two receiving portion slopes.

While, in FIGS. 6 and 7, the carriage 50 is located at a center portion of the space D in the left-right direction of the recording apparatus 100, the recording apparatus 100 is configured such that the carriage 50 is movable in the left-right direction in the space D. Accordingly, when, e.g., the roll sheet R having a smaller width is to be set in the roll set portion 200, it is possible to offset the carriage 50 to the reference-side first guide portion 210 and place the carriage 50 in the space D. In other words, by using the same carriage 50, it is possible to support the roll sheets R having different widths and place the roll sheets R over the guide portion. In addition, with the configuration of the recording apparatus 100, it is possible to use a common carrier for an operation of setting the roll sheets having the different widths, and therefore achieve a reduction in jig cost and improve work efficiency.

Rolled Sheet Setting Method

Next, a detailed description will be given of a method of setting the roll sheet R in the roll set portion 200. FIGS. 9A, 9B, 9C, and 9D are diagrams illustrating a procedure of using the carriage 50 to place the roll sheet R over the first guide portion 210 and the second guide portion 220. FIG. 10 is a diagram illustrating a procedure of attaching the roll sheet R placed over the guide portion to the spindle holders 24. For the sake of clear illustration, in FIGS. 9A to 9D and FIG. 10, inner configurations of portions of the recording apparatus 100, such as the arm member 4 and the pressure contact members 8, are indicated by solid lines.

Each of the spindle holders 24 is formed with a first bearing surface 24*a*, a first connecting surface 24*c* connecting the first bearing surface 24*a* and the first rear guide surface 31*a*, a second bearing surface 24*b*, and a second connecting surface connecting the second bearing surface 24*b* and the second rear guide surface 32*a*. Each of the first connecting surface 24*c* and the second connecting surface is downwardly inclined from a front side to a rear side. Such a configuration allows the roll sheet R to be easily moved from over the guide portion to the holder portion during the setting of the roll sheet, and can prevent the roll sheet R from being unintentionally detached from the spindle holders 24.

Figures 9A, 9B, 9C, 9D:
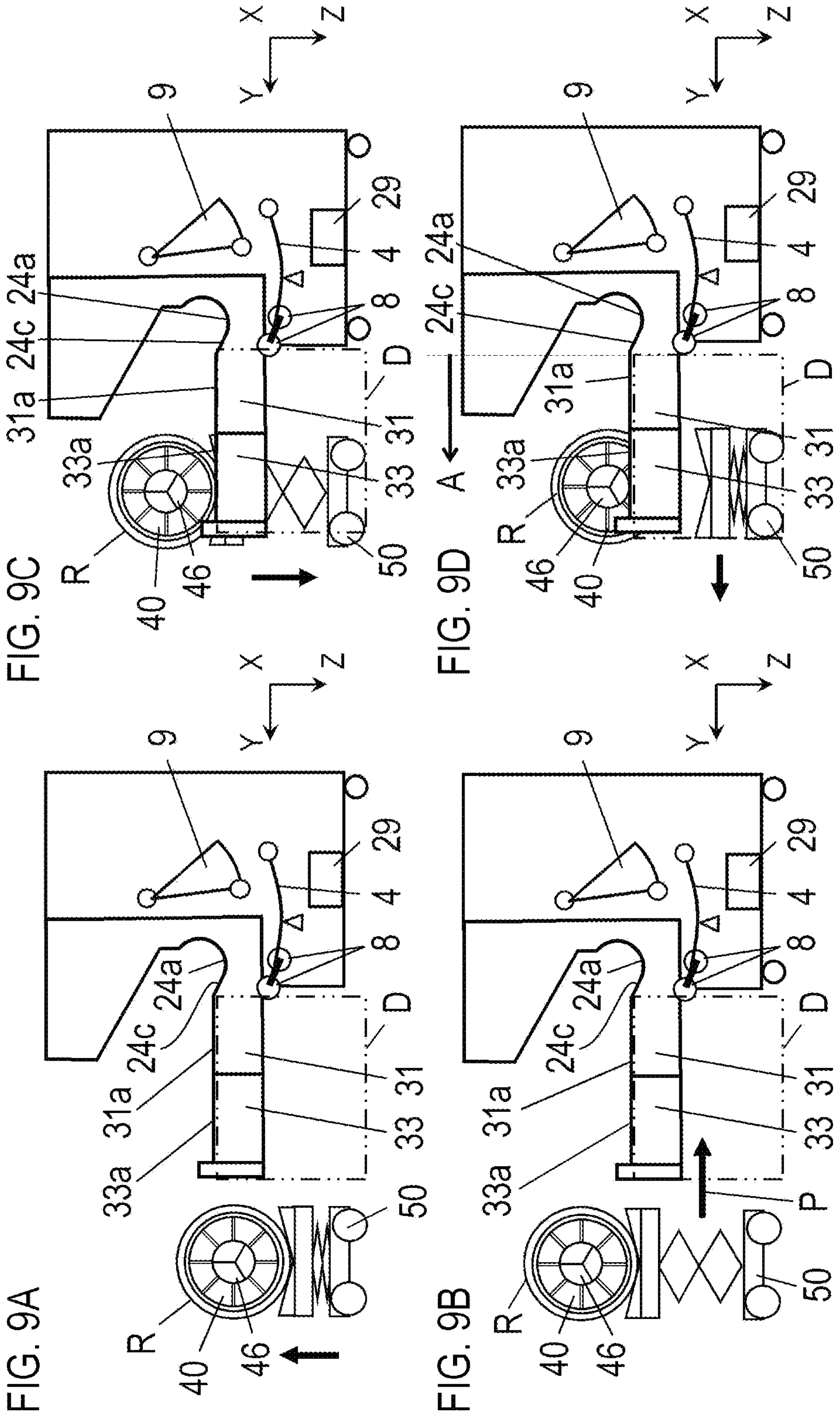
FIGS. 9A to 9D are diagrams illustrating a method of setting the roll sheet in the first embodiment.
Figure 10:
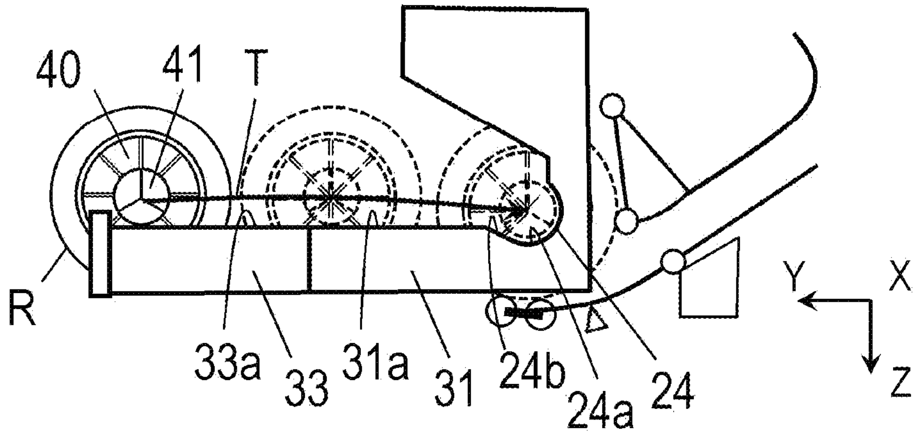
FIG. 10 is a diagram illustrating a method of guiding the roll sheet in the first embodiment.

FIG. 9A illustrates the receiving portion 51 being raised in a state where the roll sheet R is placed on the carriage 50. To cause the carriage 50 supporting the roll sheet R to enter the space D, first, the receiving portion 51 is raised using the height adjusting portion 53 such that the guide shaft 46 and the spindle gear 45 each attached to the roll sheet R are located higher than the first front guide surface 33*a* of the first front member 33. This is intended to avoid interference of the attachment member 40 with the guide portion when the carriage 50 is caused to enter the space D and place the attachment member 40 over the guide portion.

FIG. 9B illustrates a condition in which the carriage 50 supporting the roll sheet R is moved in the direction P (rearward direction) and caused to enter the space D. At this time, the carriage 50 is moved until the attachment member 40 is located above the first front member 33 and the second front member 34. When the spindle 41 is at a position not overlapping the guide portion when viewed in the gravity direction, it is necessary to move the carriage 50 in the left-right direction and adjust the position of the spindle 41 in the left-right direction. The position adjustment of the spindle 41 in the left-right direction may be performed either before or after the carriage 50 is caused to enter the space D.

FIG. 9C illustrates lowering of the receiving portion 51 in a state where the spindle 41 is located above the first front member 33 and the second front member 34. At this time, the carriage 50 is located inside the space D, while supporting the roll sheet R. When the receiving portion 51 is lowered, one end portion of the attachment member 40 lands on the first front member 33, while another end portion thereof lands on the second front member 34, and the receiving portion 51 is separated from the roll sheet R, delivery of the roll sheet R from the carriage 50 to the guide portion is completed. In other words, the worker can deliver the roll sheet R from the carriage 50 to the guide portion without raising the roll sheet R and the attachment member 40 by hand. In the first embodiment, the guide shaft 46 having a diameter larger than that of the spindle 41 is placed over the first front guide surface 33*a* of the first front member 33, while the spindle gear 45 having a diameter larger than that of the spindle 41 is placed on the second front guide surface 34*a* of the second front member 34.

FIG. 9D illustrates retrieval of the carriage 50 from the space D in a state where the roll sheet R is placed on the first front member 33 and another end portion thereof is placed on the second front member 34. After the roll sheet R is placed on the first front member 33 and the other end portion thereof is placed on the second front member 34, only the carriage 50 is moved forwardly of the recording apparatus 100 to be drawn out of the recording apparatus 100. Note that, even when the carriage 50 is placed inside the space D, the carriage 50 may also be left placed in the space D as long as the use of the recording apparatus 100 is not interrupted thereby.

As illustrated herein in FIG. 9C, the connecting portion 29 provided to extend in the left-right direction between the two main-body leg portions 27 is disposed on the rear side of the guide portion. Consequently, when the roll sheet R is to be placed over the guide portion, there is no possibility of interference of the connecting portion 29 with the roll sheet R or the carriage 50. In addition, as illustrated in FIG. 9D, the guide portion projects forwardly of the recording apparatus 100 from the spindle holder 24, and accordingly the roll sheet R can be placed over the guide portion in a region (arrow A in the drawing) on a front side of each of the arm member 4 and the pressure contact members 8. In other words, when the roll sheet R is placed over the first front member 33 and the second front member 34 of the guide portion, there is no interference of the carriage 50 with the arm member 4 or the pressure contact members 8, and therefore it is possible to operate the carriage 50 with excellent workability and place the roll sheet R over the guide portion.

As illustrated in FIG. 10, after the attachment member 40 is placed over the guide portion, the roll sheet R is moved toward the spindle holders 24, while the attachment member 40 is rolled or slid integrally with the roll sheet R over the guide portion. In FIG. 10, a trajectory of a center of a rotation axis of the roll sheet R until the roll sheet R placed over the guide portion is supported by the spindle holders is indicated by an arrow T. Since the guide surfaces of the guide portion are formed of the plane with no step, the roll sheet R can smoothly move, while being rolled or slid over the guide surfaces. This allow the worker to easily move the roll sheet R from the guide portion to the spindle holders 24 with a small force. Then, when the spindle 41 is set in the spindle holders 24, the setting of the roll sheet R in the roll set portion 200 is completed.

Thus, in the first embodiment, it is possible to deliver the roll sheet R from the carriage 50 to the guide portion without raising the roll sheet R by hand and set the roll sheet R in the spindle holders 24. In other words, it is possible to carry the roll sheet R and land the roll sheet R on the recording apparatus 100 without unloading the roll sheet R from the carriage 50. In addition, it is possible to easily move the roll sheet R landed on the recording apparatus 100 to the spindle holders 24. Consequently, the worker can set the roll sheet R in the roll set portion 200 of the recording apparatus 100 with excellent workability.

Figure 11:
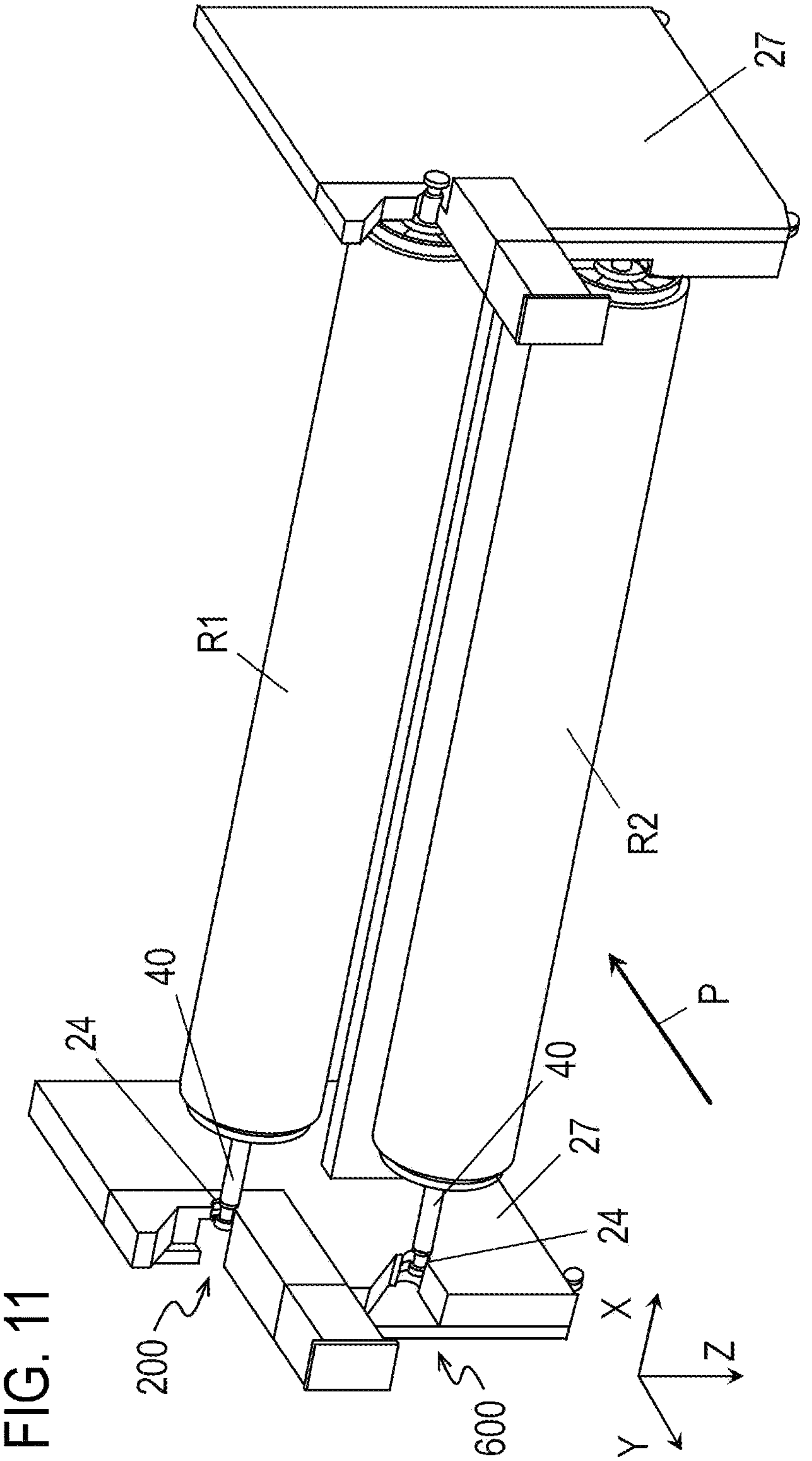
FIG. 11 is a perspective view of feeding side and winding side roll set portions in the first embodiment.

Moreover, in the first embodiment, it is possible use to the carriage 50 to detach a roll R2 from the winding side roll set portion 600. FIG. 11 is a perspective view illustrating the respective roll sheets set in the feeding side roll set portion 200 and the winding side roll set portion 600. As described above, from the roll sheet R1 supported in the roll set portion 200 located above, the sheet S is fed, and the sheet S on which the printing operation has been performed is wound up by the roll R2 supported in the roll set portion 600 located below.

The roll set portion 600 serving as a winding portion has a holder portion that rotatably supports the roll R2 and a guide portion that guides the roll R2 to the holder portion, while supporting the roll R2. Similarly to the holder portion of the roll set portion 200, the holder portion of the roll set portion 600 is configured to include the spindle holder 24. The guide portion is configured to forwardly project from the holder portion and allow the attachment member 40 attached to the roll R2 to be placed thereover. The worker raises and lowers the carriage 50 to be able to place the attachment member 40 over the guide portion and raise the attachment member 40 from the guide portion without raising the roll R2 and the attachment member 40 by hand.

Note that, when the roll sheet R is to be detached from the recording apparatus 100, the procedure described above needs only to be performed in reverse order. In other words, even when the roll sheet R is to be detached, the worker can deliver the roll sheet R from the guide portion to the carriage 50 without raising the roll sheet R by hand. In addition, the roll sheet R can smoothly move from behind the guide portion to the front side. Consequently, the worker can detach the roll sheet R from the recording apparatus 100 with excellent workability.

Also, in the first embodiment, the guide portion connected to the feeding side roll set portion 200 is configured to include the front member and the rear member, but is not limited to such a configuration in applying the present invention. For example, even when each of the first guide portion 210 and the second guide portion 220 is configured to include a single member, as long as a space that can be entered by the carriage 50 is formed in the gap between the first guide portion 210 and the second guide portion 220 and blow the gap, the workability in attaching the roll sheet R is improved. In addition, in the winding side roll set portion 600, the same guide portion as that of the feeding side roll set portion 200 may also be provided.

Second Embodiment

Next, a description will be given of a second embodiment according to the present invention. The second embodiment is different from the first embodiment in a configuration of the first guide portion and the second guide portion. In the following description of the second embodiment, a description of the same configurations as those in the first embodiment is omitted by assigning the same reference numerals thereto, and a description will be given only of a configuration characteristic of the second embodiment. For example, a configuration of the printing portion 400 of the recording apparatus 100 and an image forming process in the second embodiment are the same as those in the first embodiment.

Roll Set Portion

First, a description will be given of the feeding side roll set portion in the second embodiment. In the second embodiment also, the roll set portion includes the holder portion (spindle holders 24) that rotatably supports the roll sheet R via the attachment member 40 and the guide portion connected to the holder portion to guide the roll sheet R to the holder portion, while supporting the roll sheet R. The guide portion is configured to include a first guide portion 710 and a second guide portion 720 which face each other. Each of the first guide portion 710 and the second guide portion 720 projects forwardly of the recording apparatus 100 from the spindle holders 24 to support the roll sheet R via the attachment member 40 and guide the roll sheet R to the spindle holders 24. A direction in which the first guide portion 710 and the second guide portion 720 face each other is parallel to the left-right direction of the recording apparatus 100.

Figure 12:
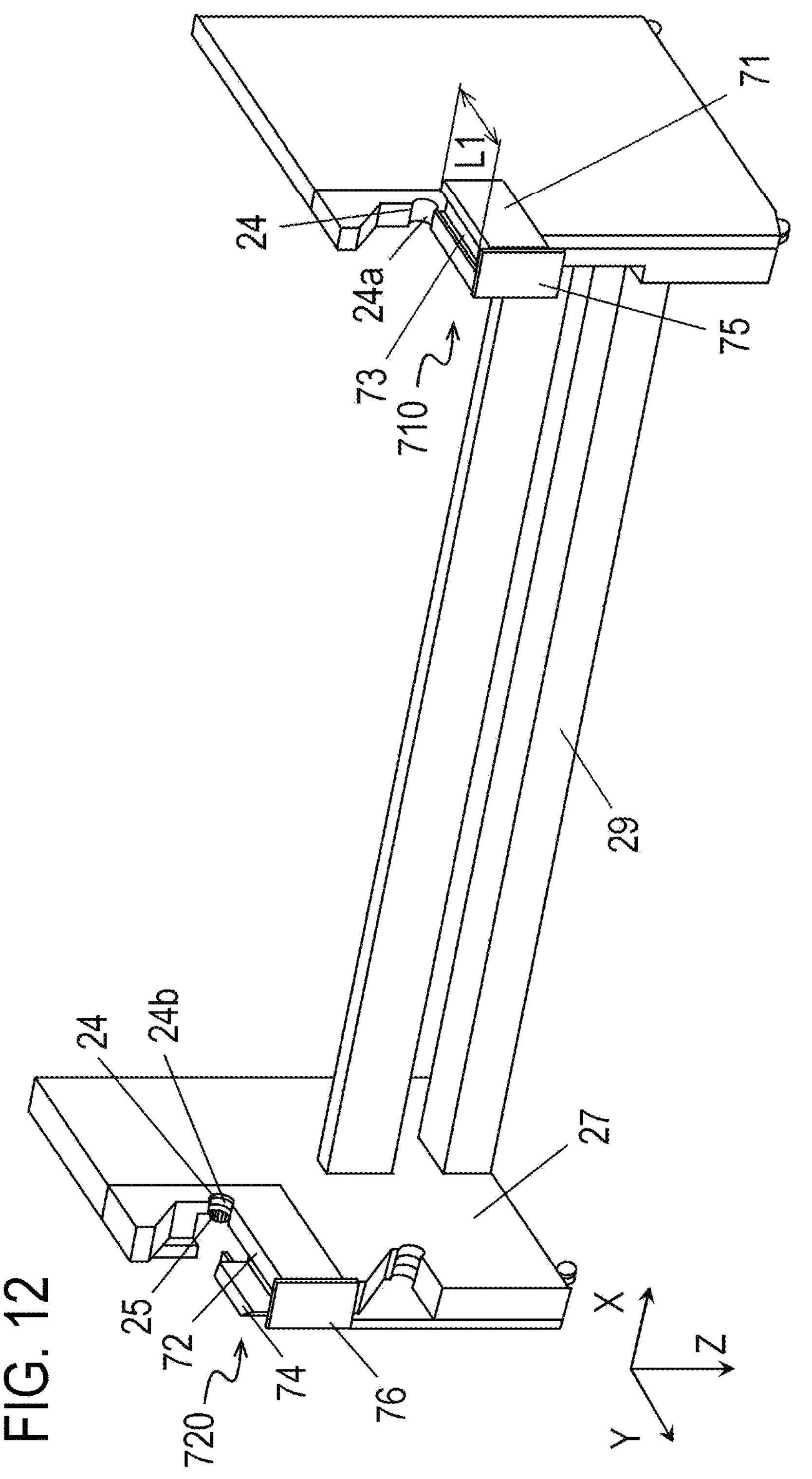
FIG. 12 is a perspective view of a guide portion in a second embodiment in a first state.
Figure 13:
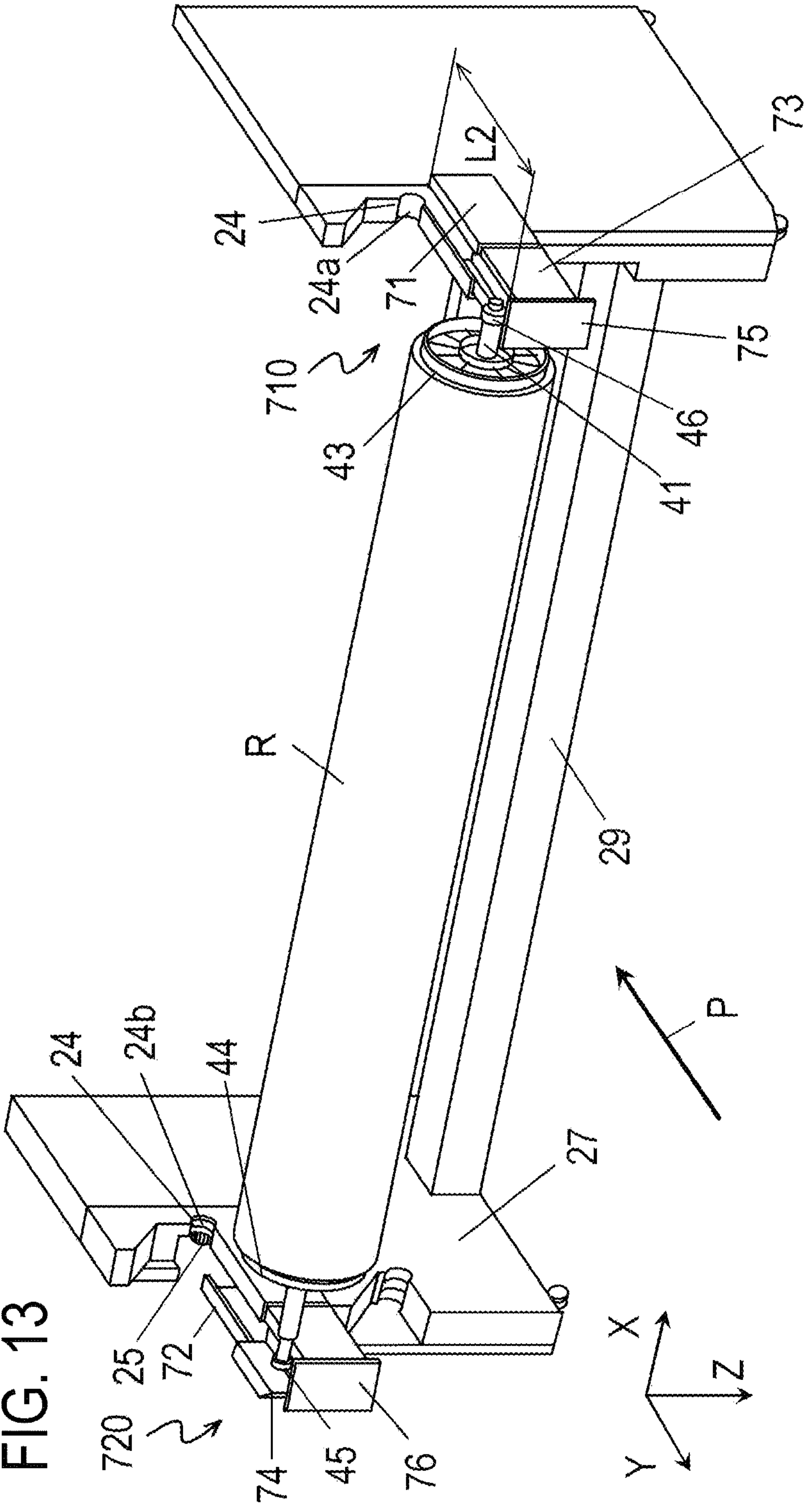
FIG. 13 is a perspective view of the guide portion in the second embodiment in a second state.
Figure 14A:
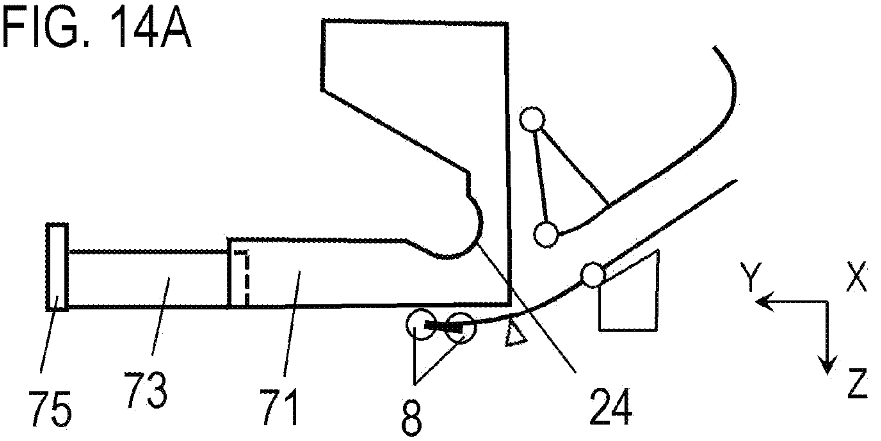
FIGS. 14A and 14B are diagrams illustrating extension and retraction of the guide portion in the second embodiment.
Figure 14B:
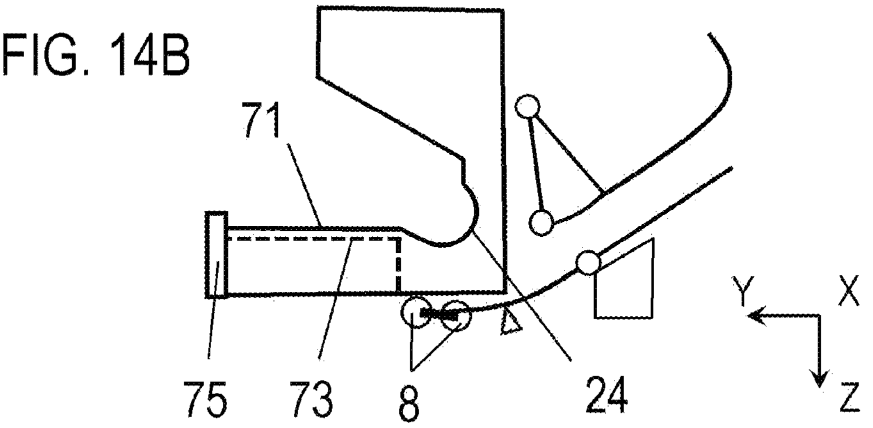

FIG. 12 is a perspective view of the periphery of the roll set portion in the second embodiment, which illustrates a condition in which the attachment member 40 attached to the roll sheet R is placed over the first guide portion 710 and the second guide portion 720. FIG. 13 is a perspective view of the periphery of the roll set portion, which illustrates a condition in which the attachment member 40 is not placed over the guide portion.

The first guide portion 710 includes a first rear member 71 forwardly projecting from the spindle holder 24 and a first front member 73 forwardly projecting from the first rear member 71. Likewise, the second guide portion 720 includes a second rear member 72 forwardly projecting from the spindle holder 24 and a second front member 74 forwardly projecting from the second rear member 72.

At a tip end of the first front member 73 of the first guide portion 710, a step portion 75 is provided to upwardly project from an upper surface of the first front member 73 while, at a tip end of the second front member 74 of the second guide portion 720, a step portion 76 is provided to upwardly project from an upper surface of the second front member 74. These step portions prevent the attachment member 40 from falling from the guide portion.

The first front member 73 is configured to slide to be movable between a position where the first front member 73 forwardly projects with respect to the first rear member 71 and a position where the first front member 73 is contained inside the first rear member 71. As a result of movement of the first front member 73 with respect to the first rear member 71 in the front-rear direction, the first guide portion 710 extends/retracts. Likewise, the second front member 74 is configured to slide to be movable between a position where the second front member 74 forwardly projects with respect to the second rear member 72 and a position where the second front member 74 is contained inside the second rear member 72. As a result of movement of the second front member 74 with respect to the second rear member 72 in the front-rear direction, the second guide portion 720 extends/retracts.

As described above, the guide portion is configured to be extendable/retractable in the front direction. In other words, the guide portion can be deformed into a first state where a length of projection of the guide portion from the spindle holder 24 is a first length L1 and into a second state where the length of projection is a second length L2 longer than the first length L1. When the guide portion is in the first state, the first front member 73 is contained inside the first rear member 71, while the second front member 74 is contained inside the second rear member 72. Meanwhile, when the guide portion is in the second state, the first front member 73 forwardly projects with respect to the first rear member 71, while the second front member 74 forwardly projects with respect to the second rear member 72.

FIG. 12 illustrates the guide portion in the first state. When the guide portion is in the first state, the first front member 73 is located inside the first rear member 71, while the second front member 74 is located inside the second rear member 72. Additionally, when the guide portion is in the first state, the step portion 75 comes into contact with a tip end of the first rear member 71, while the step portion 76 comes into contact with a tip end of the second rear member 72. The step portion 75 may also be provided with a function as a stopper of preventing the first front member 73 from excessively moving rearwardly.

When the guide portion is in the first state, the guide portion is retracted and consequently, when the worker operates the recording apparatus 100, the guide portion does not interrupt the operation. Moreover, since the guide portion is configured to be retractable, it is possible to reduce the area occupied by the main body of the installed recording apparatus 100, which contributes to space saving.

FIG. 13 illustrates the guide portion in the second state. When the guide portion is in the second state, the first front member 73 forwardly projects with respect to the first rear member 71, while the second front member 74 forwardly projects with respect to the second rear member 72. Note that, in the second embodiment, when the guide portion is in the second state, the front member and the rear member partly overlap in the front-rear direction. Alternatively, each of the front member and the rear member may also be provided with an engagement portion that prevents, when the front member is caused to project from the rear member, the front member from falling from the rear member.

When the guide portion is in the second state, the space D formed in a gap between the first guide portion 710 and the second guide portion 720 and below the gap is relatively large compared to the space D formed when the guide portion is in the first state. Accordingly, when the guide portion is in the second state, in contrast to when the guide portion is in the first state, it becomes possible to place the larger-diameter roll sheet R over the guide portion by using the carriage 50. In addition, since the space D is large, the carriage 50 can be moved in a wider range, and therefore the worker can place the roll sheet R over the guide portion with excellent workability. In other words, since both of the first guide portion 710 and the second guide portion 720 are configured to be extendable/retractable in the front-rear direction, it is possible to improve workability in replacing the roll sheet R without inhibiting the operability of the recording apparatus 100.

Note that, when the diameter or the roll sheet R is small, a width of the carriage 50 is small, and the roll sheet R and the carriage 50 do not interfere with the recording apparatus 100, it may also be possible to use the carriage 50 to directly place the roll sheet R and the attachment member 40 over of the first rear member 71 and the second rear member 72. In such a case, when the roll sheet R is to be attached to the roll set portion, the roll set portion may also be in the second state.

Next, a more detailed description will be given of a configuration of the first guide portion 710 and the second guide portion 720. When the worker integrally rolls or slides the roll sheet R and the attachment member 40 over the guide portion, due to a left-right difference in force pushing the roll sheet R, the roll sheet R tends to be inclined in the left-right direction (X-direction) and in the front-rear direction (Y-direction). When the roll sheet R and the attachment member 40 skew, the roll sheet R is not set in the spindle holders 24. Therefore, the guide portion in the second embodiment is provided with a regulating portion for preventing the attachment member 40 from skewing over the guide portion. In addition, to improve workability in setting the roll sheet R, the guide portion in the second embodiment is configured to be able to constantly support the attachment member 40 and the roll sheet R at a given height.

First Guide Portion 710

Figure 15B:
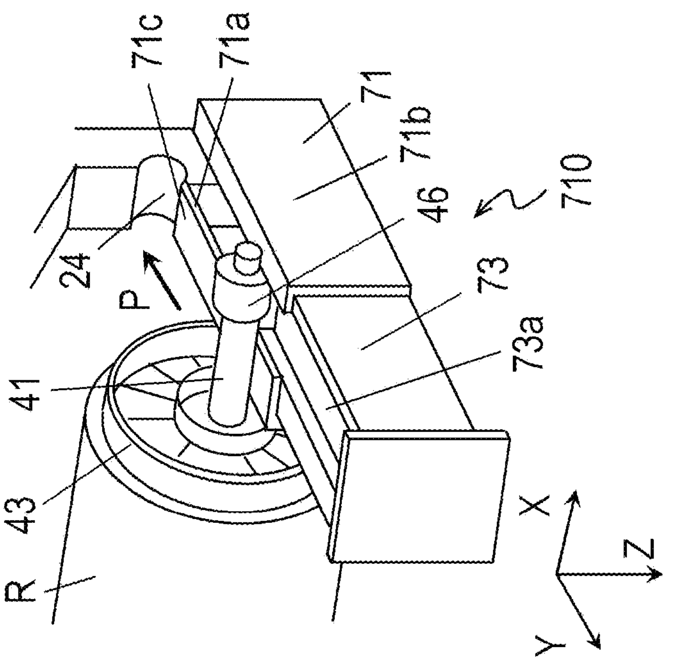
FIGS. 15A and 15B are perspective views of a reference-side first guide portion in the second embodiment.
Figure 15A:
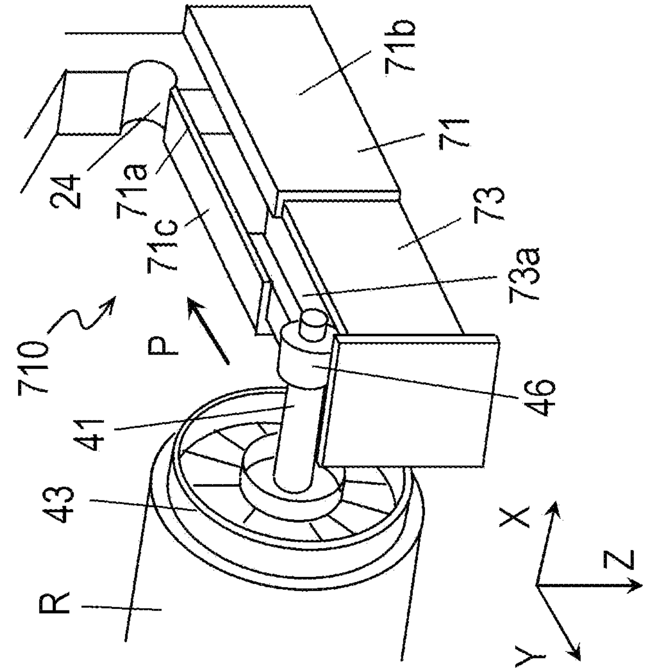
Figure 16A:
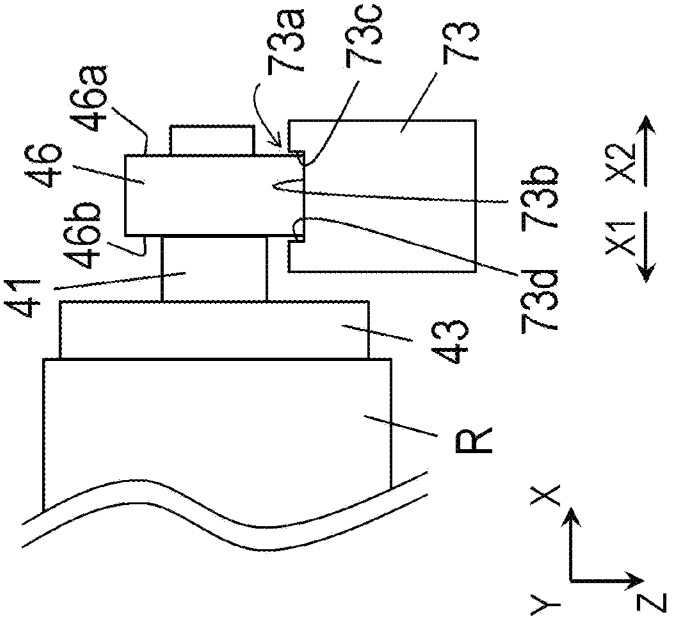
FIGS. 16A and 16B are front views of the reference-side guide portion in the second embodiment.
Figure 16B:
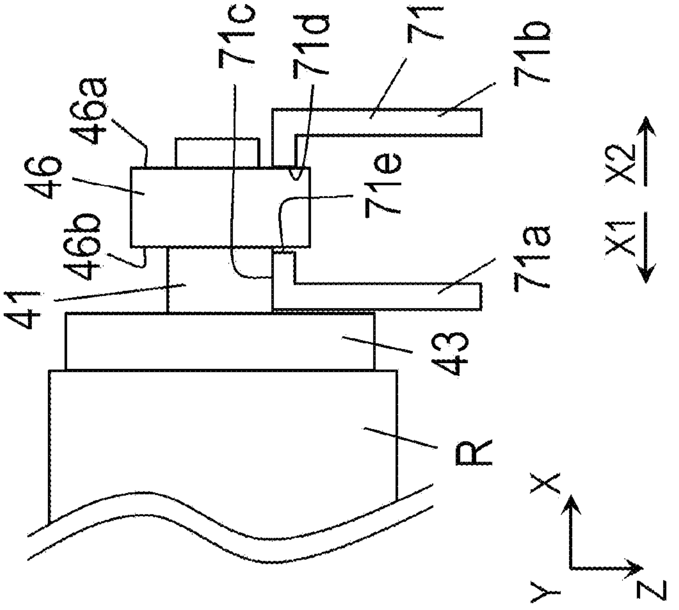
Figure 17A:
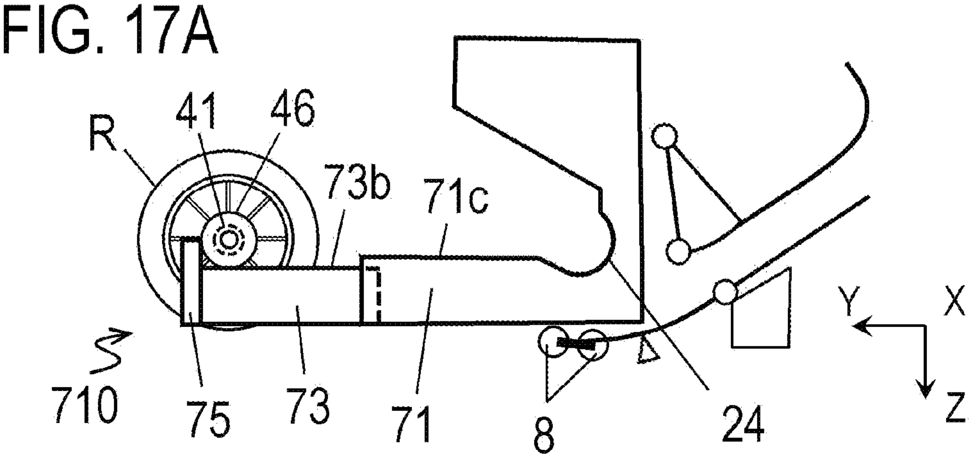
FIGS. 17A and 17B are side views of a reference-side roll set portion in the second embodiment.
Figure 17B:
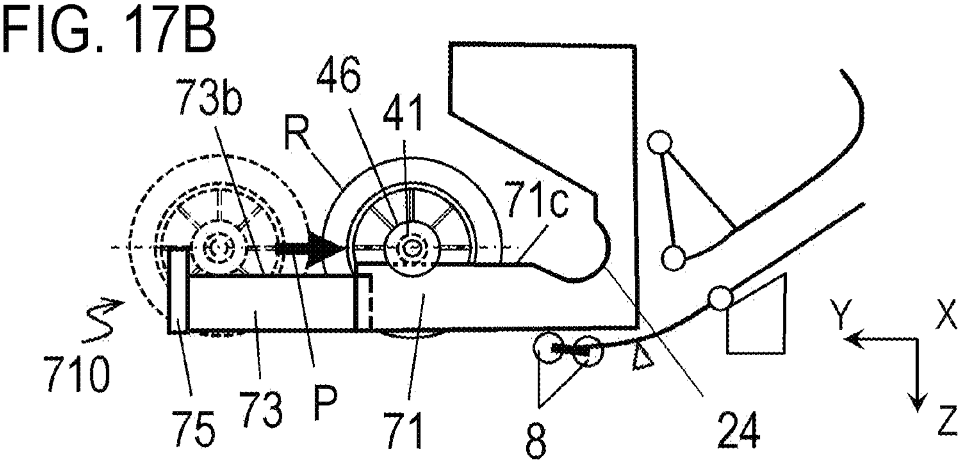

First, a description will be given of a configuration of the first guide portion 710 that supports the reference-side end portion of the attachment member 40 attached to the roll sheet R. A description will be given below on the assumption that, when one end portion of the attachment member 40 is supported by the first guide portion 710, another end portion of the attachment member 40 is supported by the second guide portion 720. FIG. 15A is a perspective view of the first guide portion 710 that supports the attachment member 40 with the first front member 73. FIG. 15B is a perspective view of the first guide portion 710 that supports the attachment member 40 with the first rear member 71. FIG. 16A is a front view of the first front member 73 that supports the attachment member 40. FIG. 16B is a front view of the first rear member 71 that supports the attachment member 40. FIG. 17A is a side view of the first guide portion 710 that supports the attachment member 40 with the first front member 73. FIG. 17B is a side view of the first guide portion 710 that supports the attachment member 40 with the first rear member 71.

The first front member 73 is a substantially square pillar member extending in the front-rear direction (Y-direction) of the recording apparatus 100. Then, in an upper surface of the first front member 73, a groove 73*a* is formed throughout the entire region in the projection direction. The groove 73*a* is formed to be interfittable with the guide shaft 46 of the attachment member 40. In the left-right direction, a width of the groove 73*a* is larger than a width of the guide shaft 46. In other words, when the groove 73*a* interfits with the guide shaft 46, between the groove 73*a* and the guide shaft 46, a gap is formed in the left-right direction.

A bottom surface of the groove 73*a* is a first front guide surface 73*b* on which the guide shaft 46 is to be placed when the first front member 73 supports the attachment member 40. Meanwhile, side surfaces of the groove 73*a* are a first front regulating surface 73*c* and a second front regulating surface 73*d* which regulate movement of the attachment member 40 in the left-right direction (X-direction) when the attachment member 40 is supported by the first front member 73. In other words, the groove 73*a* is configured to include the upwardly facing first front guide surface 73*b*, the first front regulating surface 73*c* facing a first direction X1 included in the left-right direction, and the second front regulating surface 73*d* facing a second direction X2 included in the left-right direction. Note that the first direction X1 is a direction included in the left-right direction and extending from the first guide portion 710 toward the second guide portion 720, while the second direction X2 is a direction opposite to the first direction X1 and extending from the second guide portion 720 toward the first guide portion 710.

When the guide shaft 46 is placed on the first front guide surface 73*b* of the groove 73*a*, the first front regulating surface 73*c* faces an end surface 46*a* of the guide shaft 46 facing the second direction X2, while the second front regulating surface 73*d* faces an end surface 46*b* of the guide shaft 46 facing the first direction X1. By thus being configured, when the attachment member 40 moves over the first front member 73, the first front member 73 prevents the attachment member 40 from skewing. In addition, since the gap is provided between the guide shaft 46 and the groove 73*a*, the worker can place the guide shaft 46 over the groove 73*a* with excellent workability and smoothly move the attachment member 40 over the groove 73*a*.

Note that, when an amount of gap between the groove 73*a* and the guide shaft 46 is excessively large, an effect of preventing the attachment member 40 from skewing deteriorates. Accordingly, the amount of gap is preferably set to a minimum value in consideration of manufacturing tolerance of each member or the like so as to prevent the width of the guide shaft 46 from becoming larger than the width of the groove 73*a*.

The first rear member 71 includes an inner member 71*a* located at a middle side and an outer member 71*b* located outside each in the left-right direction (X-direction) of the recording apparatus 100. Each of the inner member 71*a* and the outer member 71*b* is a member having an L-shaped cross-sectional shape and extending in the front-rear direction (Y-direction) of the recording apparatus 100. The inner member 71*a* is disposed such that an L-shaped long side portion extends in the gravity direction and a short side portion projects from the long side portion in the second direction X2 toward the outer member 71*b*. Meanwhile, the outer member 71*b* is disposed such that an L-shaped long side portion extends in the gravity direction so as to face the long side portion of the inner member 71*a* and a short side portion projects from the long side portion in the first direction X1 toward the inner member 71*a* so as to face the L-shaped short side portion of the inner member 71*a*. In other words, between the long side portion of the inner member 71*a* and the long side portion of the outer member 71*b*, a space with a large width is formed while, between the short side portion of the inner member 71*a* and the short side portion of the outer member 71*b*, a space with a small width is formed.

An upper surface of the inner member 71*a* is a first rear guide surface 71*c* on which the spindle 41 is to be placed when the attachment member 40 is supported by the first rear member 71. Meanwhile, a space in a facing portion between the short side portion of the inner member 71*a* and the short side portion of the outer member 71*b* is formed to have a width larger than the width of the guide shaft 46. In other words, in a state where the spindle 41 comes into contact with the first rear guide surface 71*c* and the guide shaft 46 is fitted in the facing portion, the attachment member 40 is placed on the first rear member 71.

The attachment member 40 is placed on the first rear member 71 and, when the guide shaft 46 is located between the inner member 71*a* and the outer member 71*b*, each of end surfaces of the respective short side portions of the inner member 71*a* and the outer member 71*b* faces the guide shaft 46. That is, each of the end surface of the inner member 71*a* facing the second direction X2 and the end surface of the outer member 71*b* facing the first direction X1 functions as the regulating portion that regulates the movement of the attachment member 40 in the left-right direction. In other words, the first rear member 71 has a first rear regulating surface 71*d* that faces the first direction X1 to regulate movement of the attachment member 40 in the second direction X2 and a second rear regulating surface 71*e* that faces the second direction X2 to regulate movement of the attachment member 40 in the first direction X1. By thus being configured, when the attachment member 40 moves over the first rear member 71, the first rear member 71 prevents the attachment member 40 from skewing. In addition, since a gap is provided between the guide shaft 46 and the first rear member 71, the worker can place the guide shaft 46 in the facing portion between the inner member 71*a* and the outer member 71*b* with excellent workability and smoothly move the attachment member 40 over the first rear guide surface 71*c*.

Note that, when an amount of gap between the first rear member 71 and the guide shaft 46 is large, the effect of preventing the attachment member 40 from skewing deteriorates. Accordingly, the amount of gap is preferably set to a minimum value in consideration of the manufacturing tolerance of each member or the like so as to prevent the width of the guide shaft 46 from becoming larger than a facing width between the short side portion of the inner member 71*a* and the short side portion of the outer member 71*b*.

As described above, the first guide portion 710 is formed with the first front regulating surface 73*c* and the first rear regulating surface 71*d* which regulate the movement of the attachment member 40 in the second direction X2, while being formed with the second front regulating surface 73*d* and the second rear regulating surface 71*e* which regulate the movement of the attachment member 40 in the first direction X1. In other words, in the first guide portion 710, a first regulating portion (the first front regulating surface 73*c* and the first rear regulating surface 71*d*)) that regulates the movement of the attachment member 40 in the second direction X2 is formed to extend from the first rear member 71 to the first front member 73. Likewise, in the first guide portion 710, a second regulating portion (the second front regulating surface 73*d* and the second rear regulating surface 71*e*) that regulates the movement of the attachment member 40 in the first direction X1 is formed to extend from the first rear member 71 to the first front member 73. By thus being configured, the first guide portion 710 prevents the attachment member 40 from skewing, while guiding the attachment member 40 to the spindle holder 24 in the direction P over the first guide portion 710. Consequently, the worker can set the roll sheet R in the roll set portion with excellent workability.

In addition, as described above, the first front member 73 supports the guide shaft 46 with the first front guide surface 73*b*, while the first rear member 71 supports the spindle 41 with the first rear guide surface 71*c*. The first front guide surface 73*b* is formed so as to have at least a portion thereof overlapping the first rear guide surface 71*c* in the front-rear direction (Y-direction), irrespective of the position of the first front member 73. By thus being configured, even while the attachment member 40 moves from over the first front member 73 to over the first rear member 71, the attachment member 40 continues to be constantly supported by the first guide portion 710.

Meanwhile, the first front guide surface 73*b* and the first rear guide surface 71*c* are formed at positions displaced from each other in each of the gravity direction (Z-direction) and the left-right direction (X-direction). In other words, the first front guide surface 73*b* and the first rear guide surface 71*c* support the attachment member 40 at positions different in each of the gravity direction (Z-direction) and the left-right direction (X-direction).

The first guide portion 710 is configured such that a height (distance in the gravity direction) from the first front guide surface 73*b* to the first rear guide surface 71*c* is equal to a difference between a radius of the guide shaft 46 (first shaft portion) of the attachment member 40 and a radius of the spindle 41 (second shaft portion). By thus being configured, the first front member 73 can support the roll sheet R and the attachment member 40 at the same height as that of each of the roll sheet R and the attachment member 40 when supported by the first rear member 71. Consequently, the attachment member 40 continues to be constantly supported at a given height by the first guide portion 710, irrespective of the position thereof in the front-rear direction. As a result, when the worker moves the attachment member 40 from over the first front member 73 to over the first rear member 71, the attachment member 40 smoothly moves without being caught by the first rear member 71. Likewise, when the worker moves the attachment member 40 from over the first rear member 71 to over the first front member 73, the attachment member 40 smoothly moves without being caught by the first front member 73. Consequently, the worker can set and detach the roll sheet R in and from the roll set portion with excellent workability.

Second Guide Portion 720

Figure 18B:
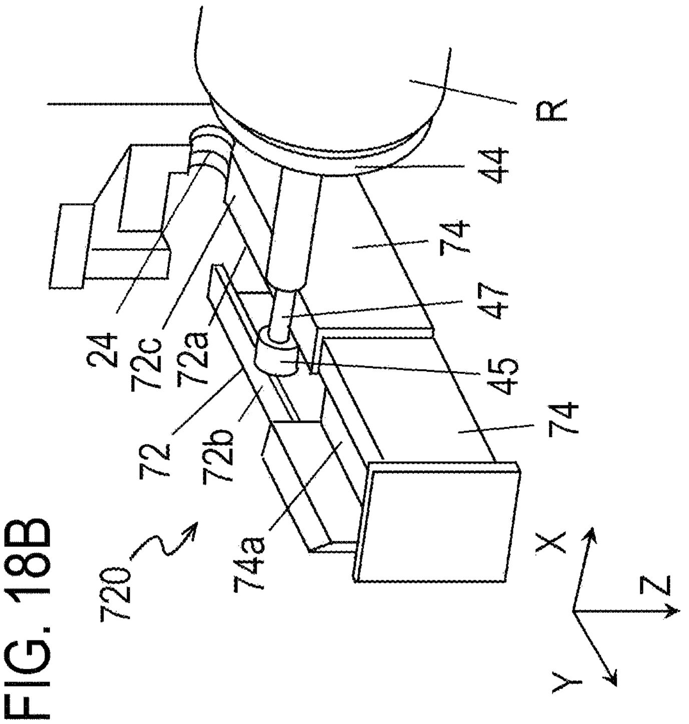
FIGS. 18A and 18B are perspective views of a non-reference-side second guide portion in the second embodiment.
Figure 18A:
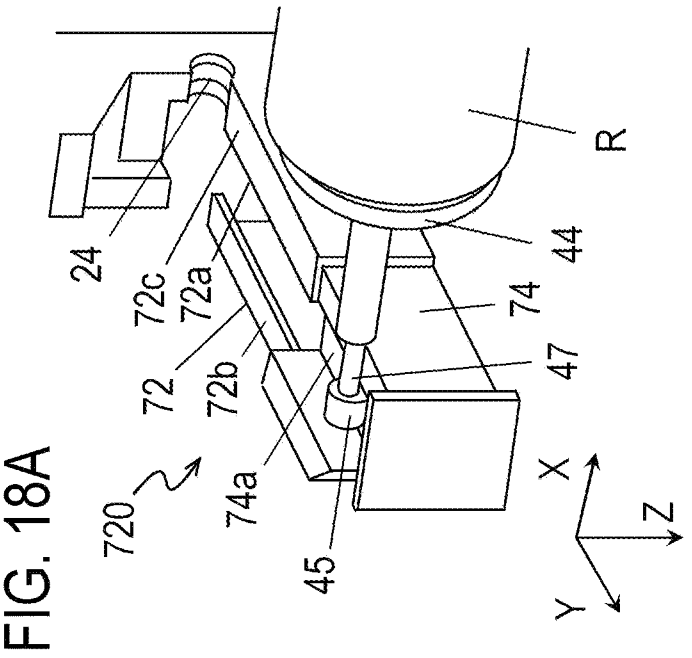
Figure 19A:
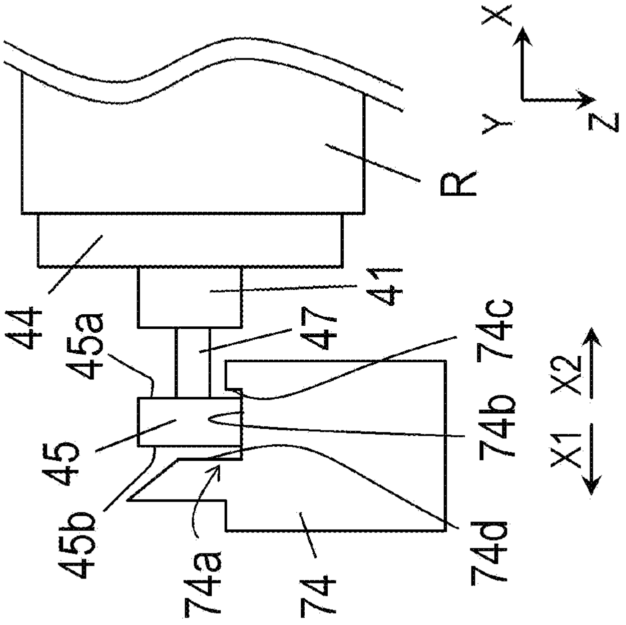
FIGS. 19A and 19B are front views of the non-reference-side second guide portion in the second embodiment.
Figure 19B:
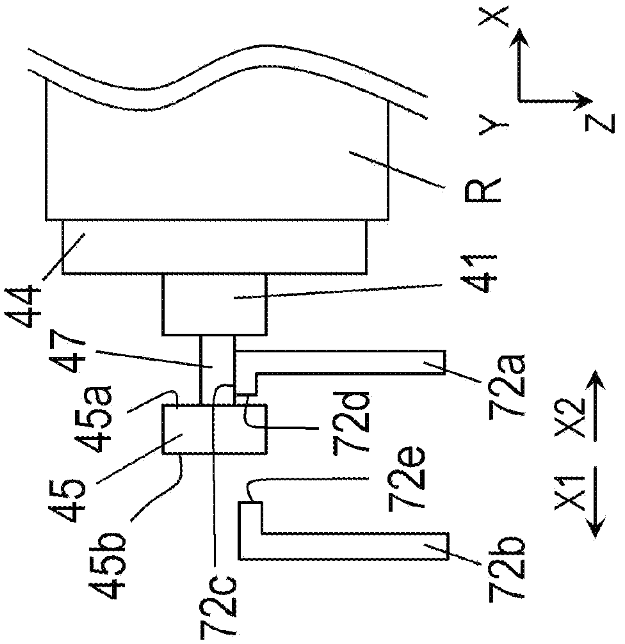
Figure 20A:
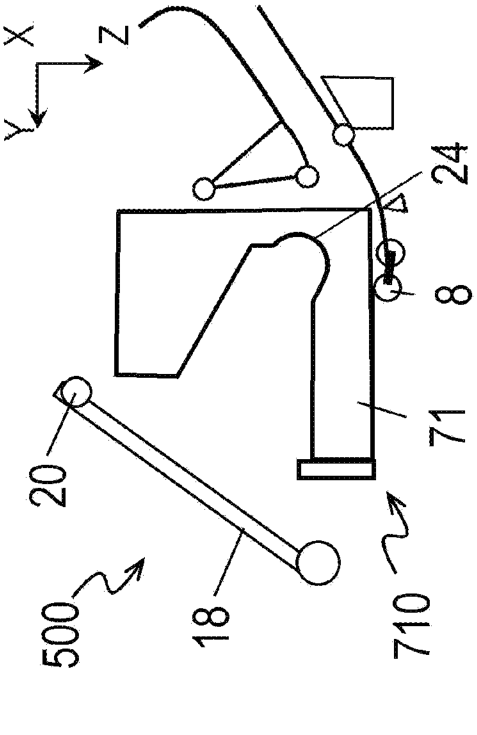
FIGS. 20A to 20D are side views of the sheet discharge guide portion and the roll set portion in a third embodiment.
Figure 20B:
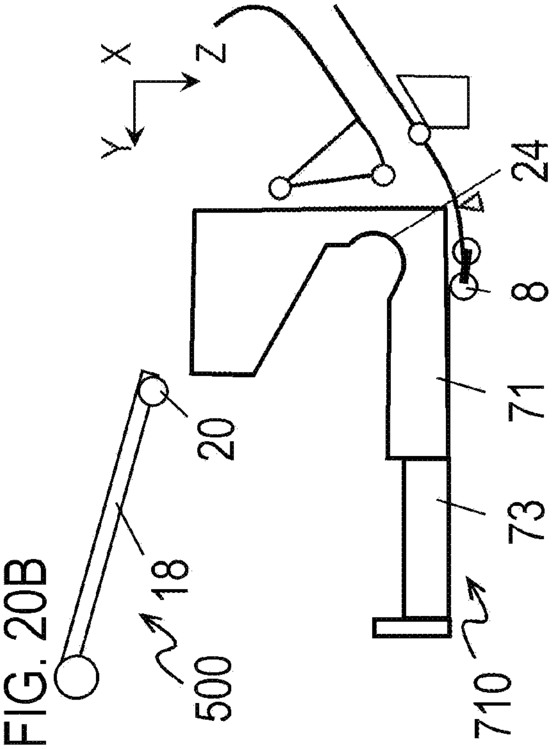

Next, a description will be given of a configuration of the second guide portion 720 that supports the non-reference-side end portion of the attachment member 40 attached to the roll sheet R. FIG. 18A is a perspective view of the second guide portion 720 that supports the attachment member 40 with the second front member 74. FIG. 18B is a perspective view of the second guide portion 720 that supports the attachment member 40 with the second rear member 72. FIG. 19A is a front view of the second front member 74 that supports the attachment member 40. FIG. 19B is a front view of the second rear member 72 that supports the attachment member 40. FIG. 20A is a side view of the second guide portion 720 that supports the attachment member 40 with the second front member 74. FIG. 20B is a side view of the second guide portion 720 that supports the attachment member 40 with the second rear member 72.

The second front member 74 is a substantially square pillar member extending in the front-rear direction (Y-direction) of the recording apparatus 100, which has a configuration similar to that of the first front member 73. In an upper surface of the second front member 74, a groove 74*a* is formed throughout the entire region in the projection direction. The groove 74*a* is formed to be interfittable with the spindle gear 45 of the attachment member 40. In the left-right direction, a width of the groove 74*a* is larger than a width of the spindle gear 45. In other words, when the groove 74*a* and the spindle gear 45 interfit with each other, between the groove 74*a* and the spindle gear 45, a gap is formed in the left-right direction.

A bottom surface of the groove 74*a* is a second front guide surface 74*b* on which the spindle gear 45 is to be placed when the second front member 74 supports the attachment member 40. Meanwhile, side surfaces of the groove 74*a* are a third front regulating surface 74*c* and a fourth front regulating surface 74*d* which regulate the movement of the attachment member 40 in the left-right direction (X-direction) when the attachment member 40 is supported by the second front member 74. In other words, the groove 74*a* is configured to include the upwardly facing second front guide surface 74*b*, the third front regulating surface 74*c* facing the first direction X1, and the fourth front regulating surface 74*d* facing the second direction X2.

When the spindle gear 45 is placed on the second front guide surface 74*b* of the groove 74*a*, the third front regulating surface 74*c* faces an end surface 45*a* of the spindle gear 45 facing the second direction X2, while the fourth front regulating surface 74*d* faces an end surface 45*b* of the spindle gear 45 facing the first direction X1. By thus being configured, when the attachment member 40 moves over the second front member 74, the second front member 74 prevents the attachment member 40 from skewing. In addition, since a gap is provided between the spindle gear 45 and the groove 74*a*, the worker can place the spindle gear 45 over the groove 74*a* with excellent workability and smoothly move the attachment member 40 over the groove 74*a*.

Note that the second front member 74 need not necessarily be configured to regulate the movement of the attachment member 40 in the left-right direction. This is because, by the first front regulating surface 73*c* and the second front regulating surface 73*d* of the first front member 73, movement of the attachment member 40 in the left-right direction is regulated. For example, even in a configuration in which an amount of gap between the fourth front regulating surface 74*d* and the end surface 45*b* is set large and the fourth front regulating surface 74*d* does not substantially function as a regulating portion, the attachment member 40 is prevented by the first front member 73 from skewing. In other words, as long as the configuration is provided with at least one regulating portion that regulates the movement of the attachment member 40 in the first direction X1 and at least one regulating portion that regulates the movement of the attachment member 40 in the second direction X2, the attachment member 40 is prevented from skewing. However, in terms of improving workability in moving the attachment member 40 over the guide portion, the second guide portion 720 is also preferably provided with the regulating portion that regulates one-way movement of the attachment member 40 in the left-right direction.

In addition, in the second embodiment, the guide portion is configured such that the amount of gap between the regulating portion of the first guide portion 710 and the attachment member 40 is smaller than the amount of gap between the regulating portion of the second guide portion 720 and the attachment member 40. This is intended to more accurately position the attachment member 40 with respect to the guide portion in the left-right direction (X-direction) in the first guide portion 710 that holds the reference side of the attachment member 40.

The second rear member 72 includes an inner member 72*a* located at a middle side and an outer member 72*b* located outside each in the left-right direction (X-direction) of the recording apparatus 100, and has a configuration similar to that of the first rear member 71. Each of the inner member 72*a* and the outer member 72*b* is a member having an L-shaped cross-sectional shape and extending in the front-rear direction (Y-direction) of the recording apparatus 100. The inner member 72*a* is disposed such that an L-shaped long side portion extends in the gravity direction and a short side portion projects from the long side portion in the first direction X1 toward the outer member 72*b*. Meanwhile, the outer member 72*b* is disposed such that an L-shaped long side portion extends in the gravity direction so as to face the long side portion of the inner member 72*a* and the short side portion projects from the long side portion in the second direction X2 toward the inner member 72*a* so as to face the L-shaped short side portion of the inner member 72*a*. In other words, between the long side portion of the inner member 72*a* and the long side portion of the outer member 72*b*, a space with a large width is formed while, between the short side portion of the inner member 72*a* and the short side portion of the outer member 72*b*, a space with a small width is formed.

An upper surface of the inner member 72*a* is a second rear guide surface 72*c* on which the guide shaft 47 of the attachment member 40 is to be placed when the attachment member 40 is supported by the second rear member 72. The guide shaft 47 is a shaft portion having a diameter smaller than that of each of the spindle 41 and the spindle gear 45, and is located between the spindle 41 and the spindle gear 45. Meanwhile, a space in a facing portion between the short side portion of the inner member 72*a* and the short side portion of the outer member 72*b* is formed to have a width larger than the width of the spindle gear 45. In other words, in a state where the guide shaft 47 comes into contact with the second rear guide surface 72*c* and the spindle gear 45 is fitted in the facing portion, the attachment member 40 is placed on the second rear member 72.

An end surface of the short side portion of the inner member 72*a* facing the first direction X1 is a third rear regulating surface 72*d* that regulates movement of the attachment member 40 in the second direction X2. In other words, in the second guide portion 720, a third regulating portion that regulates the movement of the attachment member 40 in the second direction X2 is formed to extend from the second rear member 72 to the second front member 74. The third regulating portion is configured to include the third rear regulating surface 72*d* and the third front regulating surface 74*c*.

Meanwhile, the outer member 72*b* is configured such that the end surface 72*e* of the short side portion has a large gap with respect to an end surface 45*b* of the spindle gear 45. In other words, the end surface 72*e* does not function as a regulating portion that regulates the movement of the attachment member 40 in the left-right direction. In such a configuration also, when the attachment member 40 is supported by the first rear member 71 and the second rear member 72, the attachment member 40 is prevented by the first rear regulating surface 71*d*, the second rear regulating surface 71*e*, and the third rear regulating surface 72*d* from skewing. In addition, since a space is provided between the spindle gear 45 and the second rear member 72, the worker can place the spindle gear 45 in the facing portion between the inner member 72*a* and the outer member 72*b* with excellent workability and smoothly move the attachment member 40 over the second rear guide surface 72*c*.

In addition, as described above, the second front member 74 supports the spindle gear 45 with the second front guide surface 74*b*, while the second rear member 72 supports the guide shaft 47 with the second rear guide surface 72*c*. The second front guide surface 74*b* is formed so as to have at least a portion thereof overlapping the second rear guide surface 72*c* in the front-rear direction (Y-direction), irrespective of the position of the second front member 74. By thus being configured, even while the attachment member 40 moves from over the second front member 74 to over the second rear member 72, the attachment member 40 continues to be constantly supported by the second guide portion 720.

Meanwhile, the second front guide surface 74*b* and the second rear guide surface 72*c* are formed at positions displaced from each other in each of the gravity direction (Z-direction) and the left-right direction (X-direction). In other words, the second front guide surface 74*b* and the second rear guide surface 72*c* support the attachment member 40 at positions different in each of the gravity direction (Z-direction) and the left-right direction (X-direction).

The second guide portion 720 is configured such that a height from the second front guide surface 74*b* to the second rear guide surface 72*c* is equal to a difference between a radius of the spindle gear 45 of the attachment member 40 and a radius of the guide shaft 47. By thus being configured, the second front member 74 can support the roll sheet R and the attachment member 40 at the same height as that of each of the roll sheet R and the attachment member 40 when supported by the second rear member 72. Consequently, the attachment member 40 continues to be constantly supported at a given height by the second guide portion 720, irrespective of the position thereof in the front-rear direction. As a result, when the worker moves the attachment member 40 from over the second front member 74 to over the second rear member 72, the attachment member 40 smoothly moves to the second rear member 72. Likewise, when the worker moves the attachment member 40 from over the second rear member 72 to over the second front member 74, the attachment member 40 smoothly moves without being caught by the second front member 74. Consequently, the worker can set and detach the roll sheet R in and from the roll set portion with excellent workability.

Thus, with the configuration in the second embodiment, the regulating portion formed throughout the entire region of the guide portion in the front-rear direction thereof can regulate the movement of the attachment member 40 in the left-right direction. As a result, with the configuration in the second embodiment, the attachment member 40 is easily positioned in the left-right direction, and it is possible to prevent the attachment member 40 from skewing over the guide portion. Consequently, the worker can set the roll sheet R in the roll set portion with excellent workability.

In addition, in the configuration in the second embodiment, the guide portion is configured to be extendable/retractable but, since the attachment member 40 is supported at different positions in an axial direction by the front member and the rear member of the guide portion, the roll sheet R and the attachment member 40 are constantly supported at a given height by the guide portion. Consequently, even though the guide portion is configured to include a plurality of members in the front-rear direction, when the attachment member 40 is delivered from one member to another, the attachment member 40 can move without being caught by a projection or the like. Consequently, the worker can set or detach the roll sheet R in or from the roll set portion with excellent workability.

Third Configuration

Next, a description will be given of a third embodiment according to the present invention. The third embodiment is different from the second embodiment in that the sheet discharge guide portion 500 operates in conjunction with the guide portion. In the following description of the third embodiment, a description of the same configurations as those in the second embodiment is omitted by assigning the same reference numerals thereto, and a description will be given only of a configuration characteristic of the third embodiment. For example, a configuration of the first guide portion 710 and the second guide portion 720 and an image forming process are the same as those in the second embodiment.

FIGS. 20A to 20D are side views of the sheet discharge guide portion 500 and the roll set portion in the third embodiment. When the roll sheet R is set, the sheet discharge guide portion 500 is brought into an open state, while the guide portion is extended in the front-rear direction (Y-direction) to provide the second state. Meanwhile, during the printing operation performed on the roll sheet R, the sheet discharge guide portion 500 is brought into a closed state, while the guide portion is retracted in the front-rear direction to provide the first state. A recording apparatus in the third embodiment is provided with a drive connection mechanism that changes the guide portion from the first state into the second state with the operation of opening the sheet discharge guide portion 500 and changes the guide portion from the second state into the first state with the operation of closing the sheet discharge guide portion 500.

FIG. 20A illustrates the sheet discharge guide portion 500 in the closed state and the first guide portion 710 in the first state. It is assumed that a position of the sheet discharge conveyance guide 18 when the sheet discharge guide portion 500 is in the closed state is a first position. When located at the first position, the sheet discharge conveyance guide 18 covers the first guide portion 710 and the holder portion (spindle holders 24) from a tip end side of the first guide portion 710 in the projection direction. The sheet discharge conveyance guide 18 located at the first position can guide the sheet S from the printing portion 400 to the winding side roll set portion 600. In addition, when the first guide portion 710 is in the first state, the first front member 73 is contained inside the first rear member 71.

FIG. 20B illustrates the sheet discharge guide portion 500 in the open state and the first guide portion 710 in the second state. It is assumed that a position of the sheet discharge conveyance guide 18 when the sheet discharge guide portion 500 is in the open state is a second position. When located at the second position, the sheet discharge conveyance guide 18 relieves the first guide portion 710 and the holder portion (spindle holder 24). When the first guide portion 710 is in the second state, the first front member 73 projects forwardly of the first rear member 71. The sheet discharge conveyance guide 18 pivots around the pivot shaft 20 to move to the second position and bring the sheet discharge guide portion 500 into the open state, thereby allowing the roll sheet R to be placed over the guide portion via the attachment member 40, move over the guide portion, and be set in the spindle holders 24.

In the third embodiment, the pivot shaft 20 that pivotably supports the sheet discharge conveyance guide 18 is connected by the drive connection mechanism (not shown) to a drive portion that drives the first front member 73 and the second front member 74 in the front-rear direction. In other words, the first front member 73 and the second front member 74 move in the front-rear direction with the rotation of the pivot shaft 20. As the drive portion for the drive connection mechanism or the front member, a known drive means such as a gear, a belt, a rack and pinion, a lead screw, or a link mechanism can be used.

When the recording apparatus is to be changed from a state in FIG. 20A to a state in FIG. 20B by using the drive connection mechanism described above, the worker needs only to perform an operation of changing the sheet discharge guide portion 500 into the open state. As a result of movement of the sheet discharge conveyance guide 18 from the first position to the second position, the first front member 73 and the second front member 74 automatically move forwardly to change the guide portion from the first state into the second state. In other words, in conjunction with an operation of changing the sheet discharge guide portion 500 from the closed state into the open state, the guide portion also operates. Consequently, in the third embodiment, the number of work tasks decreases compared to that in the second embodiment, and therefore the worker can perform the work of setting the roll sheet R with excellent workability.

Figure 20C:
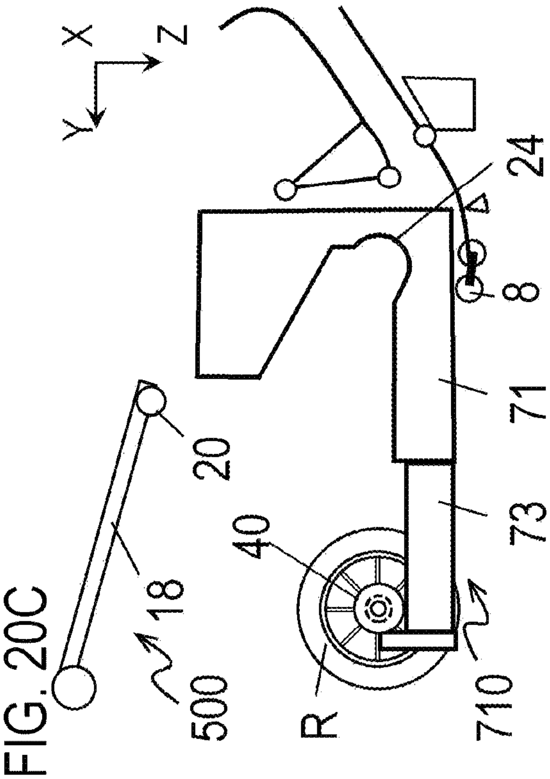

FIG. 20C illustrates a condition in which the attachment member 40 attached to the roll sheet R is placed on the guide portion in the second state. Since the sheet discharge guide portion 500 is in the open state, the worker can place the attachment member 40 over the first front member 73 and the second front member 74 of the guide portion. In the same manner as in the first embodiment and the second embodiment, in the gap between the first guide portion 710 and the second guide portion 720 and below the gap, the space D that can be entered by the carriage 50 is formed, and the worker can place the attachment member 40 attached to the roll sheet R over the guide portion with excellent workability. Then, the worker rolls or slides the attachment member 40 over the guide portion to be able to set the roll sheet R in the spindle holders 24 via the attachment member 40.

Figure 20D:
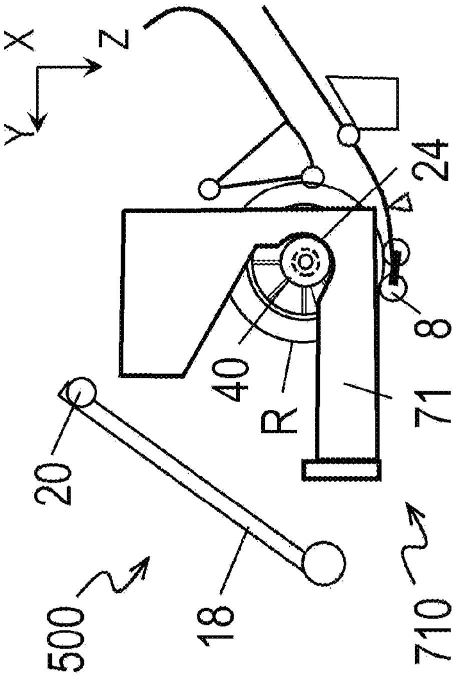

FIG. 20D illustrates a condition in which the roll sheet R has been set in the spindle holders 24, the sheet discharge guide portion 500 has been brought into the closed state, and the guide portion has been brought into the first state. After the roll sheet R is set in the spindle holders 24, in preparation for the printing operation, the worker pivots the sheet discharge conveyance guide 18 to bring the sheet discharge guide portion 500 into the closed state. As a result of movement of the sheet discharge conveyance guide 18 from the second position to the first position, the first front member 73 and the second front member 74 automatically move rearwardly to change the guide portion from the second state into the first state. In other words, the worker needs only to perform the work of changing the sheet discharge guide portion 500 into the closed state. Consequently, in the third embodiment, the number of the work tasks is reduced compared to that in the second embodiment, and therefore the worker can perform the work of setting the roll sheet R with excellent workability.

Thus, with the configuration in the third embodiment, the guide portion also operates in conjunction with the operation of the sheet discharge guide portion 500 and, consequently, the number of work tasks required during the setting of the roll sheet R and during the detachment thereof decreases to improve workability in setting and detaching the roll sheet R. Note that, in the configuration described above, by the drive connection mechanism, the sheet discharge guide portion 500 and the guide portion are physically drive-connected, but the configuration is not limited to the configuration described above in applying the present invention. For example, the configuration may also be such that, on the basis of information resulting from sensing by an open/close sensing means of the sheet discharge guide portion 500, the guide portion is driven by the drive source.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-196825, filed on Dec. 9, 2022, which is hereby incorporated by reference herein in its entirety.

What is claimed is:

1. A sheet feeding device comprising:

a holder portion that rotatably supports a roll sheet around which a sheet is wound;

a first guide portion projecting from the holder portion in a projection direction corresponding to a front direction of the sheet feeding device to guide the roll sheet to the holder portion;

a second guide portion facing the first guide portion and projecting from the holder portion in the projection direction to guide the roll sheet to the holder portion;

an arm member configured to guide the sheet fed from the roll sheet supported by the holder portion; and a contact member configured to come into contact, from below with respect to a gravity direction, with an outer peripheral surface of the roll sheet supported by the holder portion and configured to be moved by the arm member according to an outer diameter of the roll sheet, wherein, in a gap between the first guide portion and the second guide portion and below the gap, a space that can be entered by a carrier that carries the roll sheet is formed, and wherein the space is formed on a tip end side in the projection direction with respect to the contact member.

2. The sheet feeding device according to claim 1, wherein the first guide portion and the second guide portion support the roll sheet via an attachment member that is attached to the roll sheet so as to project from both end portions of the roll sheet in a width direction thereof.

3. The sheet feeding device according to claim 2, wherein the first guide portion has a first guide surface on which the attachment member is to be placed, and wherein the second guide portion has a second guide surface formed in the same plane as that of the first guide surface.

4. The sheet feeding device according to claim 3, wherein the holder portion has a first bearing surface and a second bearing surface each rotatably supporting the attachment member, a first connecting surface connecting the first bearing surface and the first guide surface, and a second connecting surface connecting the second bearing surface and the second guide surface.

5. The sheet feeding device according to claim 3, wherein a step portion projecting upward from the first guide surface is provided at a tip end of the first guide portion in the projection direction, and wherein a step portion projecting upward from the second guide surface is provided at a tip end of the second guide portion in the projection direction.

6. The sheet feeding device according to claim 2, further comprising:

a first regulating portion that comes into contact, in a facing direction in which the first guide portion and the second guide portion face each other, with the attachment member in a first direction to regulate movement of the attachment member in a second direction opposite to the first direction; and a second regulating portion that comes into contact with the attachment member in the second direction to regulate movement of the attachment member in the first direction.

7. The sheet feeding device according to claim 6, wherein the first regulating portion and the second regulating portion are formed in the first guide portion.

8. The sheet feeding device according to claim 7, further comprising:

a third regulating portion that comes into contact with the attachment member in the first direction to regulate movement of the attachment member in the second direction, the third regulating portion being formed in the second guide portion.

9. The sheet feeding device according to claim 2, further comprising:

a drive gear configured to be connected to the attachment member.

10. The sheet feeding device according to claim 1, wherein the first guide portion has a first rear member projecting from the holder portion in the projection direction and a first front member projecting from the first rear member in the projection direction, wherein the second guide portion has a second rear member projecting from the holder portion in the projection direction and a second front member projecting from the second rear member in the projection direction, and wherein the space is formed at least in a gap between the first front member and the second front member and below the gap between the first front member and the second front member.

11. The sheet feeding device according to claim 10, wherein the first front member is configured to be movable to a position where the first front member is contained inside the first rear member, and wherein the second front member is configured to be movable to a position where the second front member is contained inside the second rear member.

12. The sheet feeding device according to claim 1, further comprising:

a flapper arranged above the arm member and configured to come into contact with the outer peripheral surface of the roll sheet.

13. A recording apparatus comprising:

a sheet feeding device; and a recording portion that performs a recording operation on a sheet fed out from the sheet feeding device, wherein the sheet feeding device includes:

a holder portion that rotatably supports a roll sheet around which a sheet is wound;

a first guide portion projecting from the holder portion in a projection direction corresponding to a front direction of the sheet feeding device to guide the roll sheet to the holder portion;

a second guide portion facing the first guide portion and projecting from the holder portion in the projection direction to guide the roll sheet to the holder portion;

an arm member configured to guide the sheet fed from the roll sheet supported by the holder portion; and a contact member configured to come into contact, from below with respect to a gravity direction, with an outer peripheral surface of the roll sheet supported by the holder portion and configured to be moved by the arm member according to an outer diameter of the roll sheet, wherein, in a gap between the first guide portion and the second guide portion and below the gap, a space that can be entered by a carrier that carries the roll sheet is formed, and wherein the space is formed on a tip end side in the projection direction with respect to the contact member.

14. The recording apparatus according to claim 13, further comprising:

a winding portion located, in the projection direction, on the same side as that of the holder portion with respect to the recording portion, the winding portion supporting a roll that takes up the sheet on which the recording operation has been performed.

15. The recording apparatus according to claim 14, wherein the winding portion is located below the holder portion, wherein the recording apparatus further comprises a sheet guide member that guides the sheet from the recording portion to the winding portion, and wherein the sheet guide member is movable between a first position where the sheet guide member covers the holder portion from a tip end side of the first guide portion in the projection direction and guides the sheet to the winding portion, and a second position where the holder portion is relieved and does not interfere with the roll sheet in a case the carrier supporting the roll sheet entering the space.

16. The recording apparatus according to claim 15, wherein the first guide portion and the second guide portion are deformable into a first state where a length of projection of each of the first guide portion and the second guide portion from the holder portion is a first length and a second state where the length of projection is a second length longer than the first length, and wherein the recording apparatus further comprises a drive connection mechanism that deforms a state of the guide portion from the first state to the second state in conjunction with movement of the sheet guide member from the first position to the second position.

* * * * *